US009628295B2

(12) United States Patent
Wu et al.

(10) Patent No.: US 9,628,295 B2
(45) Date of Patent: Apr. 18, 2017

(54) METHOD, DEVICE, AND ROUTING SYSTEM FOR DATA TRANSMISSION OF NETWORK VIRTUALIZATION

(71) Applicant: Huawei Technologies Co., Ltd., Shenzhen (CN)

(72) Inventors: Xiaoqian Wu, Shenzhen (CN); Jiehui Hu, Beijing (CN); Jie Yang, Beijing (CN); Yuangui Wen, Shenzhen (CN); Xinping Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 118 days.

(21) Appl. No.: 14/819,187

(22) Filed: Aug. 5, 2015

(65) Prior Publication Data
US 2015/0349978 A1 Dec. 3, 2015

Related U.S. Application Data

(63) Continuation of application No. PCT/CN2013/071450, filed on Feb. 6, 2013.

(51) Int. Cl.
*H04L 12/46* (2006.01)
*H04L 12/24* (2006.01)
*H04L 12/709* (2013.01)

(52) U.S. Cl.
CPC ...... *H04L 12/4675* (2013.01); *H04L 12/4641* (2013.01); *H04L 41/0803* (2013.01); *H04L 45/245* (2013.01)

(58) Field of Classification Search
None
See application file for complete search history.

(56) References Cited

U.S. PATENT DOCUMENTS 6,496,510 B1   12/2002  Tsukakoshi et al.
8,144,621 B2 *  3/2012  Fujita ............... H04L 12/66
                                                      370/254

(Continued)

FOREIGN PATENT DOCUMENTS

CN       1468007 A    1/2004
CN     101175326 A    5/2008

(Continued)

OTHER PUBLICATIONS

"Requirements for an Independent, Scalable Control Plane in Future, Packet-Based Networks," Series Y: Global Information Infrastructure, Internet Protocol Aspects and Next-Generation Networks, Next Generation Networks—Smart Ubiquitous Networks, ITU-T, Telecommunication Standardization Sector of ITU, Y.2621, Aug. 2011, 14 pages.

(Continued)

*Primary Examiner* — Hong Cho
(74) *Attorney, Agent, or Firm* — Slater Matsil, LLP

(57) ABSTRACT

A method resolves connectivity of services inside a network virtualization system when a virtual cluster system supports unicast IP, L2VPN, and L3VPN services, so that the software network virtualization system can support various types of services efficiently and with high quality. The method includes: creating, on a control device, a virtualized remote logical interface for an external interface of a remote access node; identifying, by the control device according to a service configured on the virtualized remote logical interface, a service type of the service, and generating virtual link forwarding entries of the remote access node and a core aggregation node; and sending, by the control device, the virtual link forwarding entry to the remote access node and the core aggregation node, so as to set up a virtual link (Continued)

between the core aggregation node and the remote access node.

19 Claims, 12 Drawing Sheets

(56) References Cited

U.S. PATENT DOCUMENTS

| | | | |
|---|---|---|---|
| 8,738,802 B2* | 5/2014 | Fan | H04L 45/58 709/238 |
| 2004/0013120 A1 | 1/2004 | Shen | |
| 2005/0102420 A1 | 5/2005 | Major et al. | |
| 2006/0168279 A1 | 7/2006 | Lee et al. | |
| 2009/0219934 A1 | 9/2009 | Deshpande | |
| 2011/0286342 A1* | 11/2011 | Ee | H04L 45/58 370/252 |
| 2012/0218994 A1 | 8/2012 | Zheng | |
| 2012/0327811 A1 | 12/2012 | Nozaki | |

FOREIGN PATENT DOCUMENTS

| | | |
|---|---|---|
| CN | 101335708 A | 12/2008 |
| CN | 101369934 A | 2/2009 |
| CN | 102045250 A | 5/2011 |
| CN | 102195844 A | 9/2011 |
| CN | 102437919 A | 5/2012 |
| CN | 102511151 A | 6/2012 |
| EP | 2608459 A2 | 6/2013 |
| JP | 2006211661 A | 8/2006 |
| JP | 2013009049 A | 1/2013 |
| WO | 2011047598 A1 | 4/2011 |

OTHER PUBLICATIONS

"ITU-T Y.2600 Series—Supplement on Scenarios for Independent Scalable Control Plane (iSCP) in Future Packet-Based Networks (FPBN)," Series Y: Global Information Infrastructure, Internet Protocol Aspects and Next-Generation Networks, Next Generation Networks, ITU-T, Telecommunication Standardization Sector of ITU, Series Y, Supplement 11, Jan. 2010, 18 pages.

"Virtual Router Cluster System Based on the Separation of the Control Plane and the Data Plane," Telecommunications Network Technology, No. 11, Expert Viewpoint, Aug. 17, 2011, 6 pages.

"Architecture of an Independent Scalable Control Plane in Future Packet Based Networks," Series Y: Global Information Infrastructure, Internet Protocol Aspects and Next-Generation Networks, Next Generation Networks—Packet-Based Networks, ITU-T, Telecommunication Standardization Sector of ITU, Y.2622, Jul. 2012, 24 pages.

* cited by examiner

METHOD, DEVICE, AND ROUTING SYSTEM FOR DATA TRANSMISSION OF NETWORK VIRTUALIZATION

This application is a continuation of International Application No. PCT/CN2013/071450, filed on Feb. 6, 2013, which is hereby incorporated by reference in its entirety.

TECHNICAL FIELD

The application relates to the field of communications, and in particular, to a method, a device, and a routing system for data transmission of network virtualization.

BACKGROUND

Base station backhaul (RadioAccessNet-work, RAN for short) refers to a transport network centralized between a base transceiver station (Base Transceiver Station, BTS for short) and a base station controller (Base Station Controller, BSC for short). An Internet Protocol radio access network IPRAN (Internet Protocol Radio Access Network, IPRAN for short) is a router/switch total solution that is optimized and customized for an application scenario of the base station backhaul, and has capabilities such as circuit simulation and synchronization, which improves operation administration and maintenance (Operation Administration and Maintenance, OAM for short) and protection capabilities. An IPRAN supporting solution is a solution in which an aggregation/core layer in a metropolitan area network uses an Internet Protocol/multi-protocol label switching (Internet Protocol/Multi-Protocol Label Switching, IP/MPLS for short) technology, and an access layer mainly uses an enhanced Ethernet technology or the IP/MPLS technology, where a device used on a core aggregation node is a router that supports IP/MPLS, and a device used on a base station access node is a router or a Layer 3 switch.

At present, a solution to an IPRAN is complex to configure and manage, and a network virtualization technology may be introduced to the IPRAN to simplify a network structure, reduce costs, and simplify configuration, management, and maintenance. However, in an existing network virtualization processing solution for a metropolitan area network and IPRAN, connectivity of various services inside a network virtualization routing system is implemented by setting up, according to different service types such as unicast IP, L2VPN, and L3VPN services, corresponding IP, L2VPN, and L3VPN service channels inside the network virtualization routing system. This requires complementary adaption inside the network virtualization routing system for each type of service, which is complex to process and has poor connectivity.

SUMMARY

Embodiments of the application provide a method, a device, and a routing system for data transmission of network virtualization, and resolves a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

To achieve the foregoing objectives, the embodiments of the application use the following technical solutions:

According to a first aspect, a method for data transmission of network virtualization is provided, including:

creating, on a control device, a virtualized remote logical interface for an external interface of a remote access node, where the external interface of the remote access node is an interface that is configured to connect to another network device;

identifying, by the control device according to a service configured on the virtualized remote logical interface, a service type of the service, and generating virtual link forwarding entries of the remote access node and a core aggregation node, where the virtual link forwarding entry includes a virtual link forwarding entry of the core aggregation node and a virtual link forwarding entry of the remote access node, an interface of an attachment circuit (Attachment Circuit) in the virtual link forwarding entry of the core aggregation node is the virtualized remote logical interface, and an interface of an attachment circuit in the virtual link forwarding entry of the remote access node is the external interface; and sending, by the control device, the virtual link forwarding entry to the remote access node and the core aggregation node, so as to set up a virtual link between the core aggregation node and the remote access node.

With reference to the first aspect, in a first possible implementation manner, the method specifically includes: generating, by the control device, a service forwarding entry of the core aggregation node, by performing centralized calculation according to the service configured on the virtualized remote logical interface and a service protocol of the service to be processed, and sending the service forwarding entry to the core aggregation node, where an outbound interface of the service forwarding entry is the virtualized remote logical interface.

With reference to the first possible implementation manner, in a second possible implementation manner, the service forwarding entry includes a unicast Internet Protocol IP routing and forwarding entry, a Layer 3 virtual private network L3VPN routing and forwarding entry, or a Layer 2 virtual private network L2VPN forwarding entry.

With reference to the first aspect, the first possible implementation manner, or the second possible implementation manner, in a third possible implementation manner, the sending, by the control device, the virtual link forwarding entry to the remote access node and the core aggregation node includes:

sending, by the control device, the virtual link forwarding entry to the core aggregation node through a control channel between the control device and the core aggregation node, and sending, by the control device, the virtual link forwarding entry to the remote access node through a control channel between the remote access node and the core aggregation node.

With reference to the first aspect, the first possible implementation manner, the second possible implementation manner, or the third possible implementation manner, in a fourth possible implementation manner, the core aggregation node includes a core aggregation node as a main frame and a core aggregation node as a backup frame; and the core aggregation node as a main frame and the core aggregation node as a backup frame share the control device, where the sending, by the control device, the virtual link forwarding entry to the remote access node and the core aggregation node specifically includes: sending, by the control device, the virtual link forwarding entry to the remote access node, the core aggregation node as a main frame, and the core aggregation node as a backup frame.

With reference to the fourth possible implementation manner, in a fifth possible implementation manner, the sending the service forwarding entry to the core aggregation node includes: setting a routing entry in a first service forwarding entry that is generated for the core aggregation node as a main frame as a primary route, and sending the first service forwarding entry to the core aggregation node as a main frame; and setting a routing entry in a second service forwarding entry that is generated for the core aggregation node as a backup frame as a secondary route, and sending the second service forwarding entry to the core aggregation node as a backup frame.

According to a second aspect, a method for data transmission of network virtualization is provided, including:

creating, on a core aggregation node, a virtualized remote logical interface for an external interface of a remote access node, where the external interface of the remote access node is an interface that is configured to connect to another network device;

identifying, by the core aggregation node according to a service configured on the virtualized remote logical interface, a service type of the service, and generating virtual link forwarding entries of the remote access node and the core aggregation node, where the virtual link forwarding entry includes a virtual link forwarding entry of the core aggregation node and a virtual link forwarding entry of the remote access node, and an interface of an attachment circuit (Attachment Circuit) in the virtual link forwarding entry of the core aggregation node is the virtualized remote logical interface; and storing, by the core aggregation node, the virtual link forwarding entry of the core aggregation node, and sending the virtual link forwarding entry of the remote access node to the remote access node, so as to set up a virtual link between the core aggregation node and the remote access node.

With reference to the second aspect, in a first possible implementation manner, the method specifically includes: generating, by the core aggregation node, a service forwarding entry of the core aggregation node, by performing centralized calculation according to the service configured on the virtualized remote logical interface and a service protocol of the service to be processed, and storing the service forwarding entry, where an outbound interface of the service forwarding entry is the virtualized remote logical interface.

With reference to the first possible implementation manner, in a second possible implementation manner, the service forwarding entry includes a unicast Internet Protocol IP routing and forwarding entry, a Layer 3 virtual private network L3VPN routing and forwarding entry, or a Layer 2 virtual private network L2VPN forwarding entry.

With reference to the second aspect, the first possible implementation manner, or the second possible implementation manner, in a third possible implementation manner, the sending, by the core aggregation node, the virtual link forwarding entry to the remote access node includes:

sending, by the core aggregation node, the virtual link forwarding entry to the remote access node through a control channel between the remote access node and the core aggregation node.

With reference to the second aspect, the first possible implementation manner, the second possible implementation manner, or the third possible implementation manner, in a fourth possible implementation manner, the core aggregation node includes a core aggregation node as a main frame and a core aggregation node as a backup frame, where the sending, by the core aggregation node, the virtual link forwarding entry to the remote access node specifically includes: sending, by the core aggregation node as a main frame, the virtual link forwarding entry to the remote access node and the core aggregation node as a backup frame.

With reference to the fourth possible implementation manner, in a fifth possible implementation manner, the method specifically includes: setting, by the core aggregation node as a main frame, a routing entry in a first service forwarding entry that is generated for the core aggregation node as a main frame as a primary route, and storing the first service forwarding entry; and setting, by the core aggregation node as a main frame, a routing entry in a second service forwarding entry that is generated for the core aggregation node as a backup frame as a secondary route, and sending the second service forwarding entry to the core aggregation node as a backup frame.

According to a third aspect, a control device is provided, including:

a logical interface setter, configured to create, on the control device, a virtualized remote logical interface for an external interface of a remote access node, where the external interface of the remote access node is an interface that is configured to connect to another network device;

a data calculator, configured to identify, according to a service configured on the virtualized remote logical interface that is created by the logical interface setter, a service type of the service, and generate virtual link forwarding entries of the remote access node and a core aggregation node, where the virtual link forwarding entry includes a virtual link forwarding entry of the core aggregation node and a virtual link forwarding entry of the remote access node, an interface of an attachment circuit (Attachment Circuit) in the virtual link forwarding entry of the core aggregation node is the virtualized remote logical interface, and an interface of an attachment circuit in the virtual link forwarding entry of the remote access node is the external interface; and a data transmitter, configured to send the virtual link forwarding entry that is generated by the data calculator to the remote access node and the core aggregation node, so as to set up a virtual link between the core aggregation node and the remote access node.

With reference to the third aspect, in a first possible implementation manner, the data calculator is further configured to generate a service forwarding entry of the core aggregation node by performing centralized calculation according to the service configured on the virtualized remote logical interface and a service protocol of the service to be processed, and send the service forwarding entry to the core aggregation node, where an outbound interface of the service forwarding entry is the virtualized remote logical interface.

With reference to the first possible implementation manner, in a second possible implementation manner, the service forwarding entry includes a unicast Internet Protocol IP routing and forwarding entry, a Layer 3 virtual private network L3VPN routing and forwarding entry, or a Layer 2 virtual private network L2VPN forwarding entry.

With reference to the third aspect, the first possible implementation manner, or the second possible implementation manner, in a third possible implementation manner, the data transmitter includes:

a data sending subunit, configured to send the virtual link forwarding entry to the core aggregation node through a control channel between the control device and the core aggregation node, and send, by using the control device, the virtual link forwarding entry to the remote access node through a control channel between the remote access node and the core aggregation node.

With reference to the third aspect, the first possible implementation manner, the second possible implementation manner, or the third possible implementation manner, in a fourth possible implementation manner, the core aggregation node includes a core aggregation node as a main frame and a core aggregation node as a backup frame; and the core aggregation node as a main frame and the core aggregation node as a backup frame share the control device, where the data transmitter is specifically further configured to send the virtual link forwarding entry to the remote access node, the core aggregation node as a main frame, and the core aggregation node as a backup frame.

With reference to the fourth possible implementation manner, in a fifth possible implementation manner, the data transmitter is further configured to set a routing entry in a first service forwarding entry that is generated for the core aggregation node as a main frame as a primary route, and send the first service forwarding entry to the core aggregation node as a main frame; and the data transmitter is further configured to set a routing entry in a second service forwarding entry that is generated for the core aggregation node as a backup frame as a secondary route, and send the second service forwarding entry to the core aggregation node as a backup frame.

According to a fourth aspect, a core aggregation node is provided, including:

a logical interface setter, configured to create, on the core aggregation node, a virtualized remote logical interface for an external interface of a remote access node, where the external interface of the remote access node is an interface that is configured to connect to another network device;

a data calculator, configured to identify, according to a service configured on the virtualized remote logical interface that is created by the logical interface setter, a service type of the service, and generate virtual link forwarding entries of the remote access node and the core aggregation node, where the virtual link forwarding entry includes a virtual link forwarding entry of the core aggregation node and a virtual link forwarding entry of the remote access node, and an interface of an attachment circuit (Aattachment Circuit) in the virtual link forwarding entry of the core aggregation node is the virtualized remote logical interface; and a data transmitter, configured to store the virtual link forwarding entry of the core aggregation node, and send the virtual link forwarding entry that is of the remote access node and generated by the data calculator to the remote access node, so as to set up a virtual link between the core aggregation node and the remote access node.

With reference to the fourth aspect, in a first possible implementation manner, the data calculator is further configured to generate a service forwarding entry of the core aggregation node by performing centralized calculation according to the service configured on the virtualized remote logical interface and a service protocol of the service to be processed, and store the service forwarding entry, where an outbound interface of the service forwarding entry is the virtualized remote logical interface.

With reference to the first possible implementation manner, in a second possible implementation manner, the service forwarding entry includes a unicast Internet Protocol IP routing and forwarding entry, a Layer 3 virtual private network L3VPN routing and forwarding entry, or a Layer 2 virtual private network L2VPN forwarding entry.

With reference to the fourth aspect, the first possible implementation manner, or the second possible implementation manner, in a third possible implementation manner, the data transmitter includes:

a data sending subunit, configured to send the virtual link forwarding entry to the remote access node through a control channel between the remote access node and the core aggregation node.

With reference to the fourth aspect, the first possible implementation manner, or the second possible implementation manner, or the third possible implementation manner, in a fourth possible implementation manner, the core aggregation node includes a core aggregation node as a main frame and a core aggregation node as a backup frame, where the data transmitter is specifically further configured to send the virtual link forwarding entry to the remote access node and the core aggregation node as a backup frame.

With reference to the fourth possible implementation manner, in a fifth possible implementation manner, the data transmitter is further configured to set a routing entry in a first service forwarding entry that is generated for the core aggregation node as a main frame as a primary route, and store the first service forwarding entry; and set, by using the core aggregation node as a main frame, a routing entry in a second service forwarding entry that is generated for the core aggregation node as a backup frame as a secondary route, and send the second service forwarding entry to the core aggregation node as a backup frame.

According to a fifth aspect, a control device is provided, including: a processor and a memory that are connected by using a data bus, and a communications port that is separately connected to the processor and the memory, where:

the processor is configured to create, on the control device, a virtualized remote logical interface for an external interface of a remote access node, where the external interface of the remote access node is an interface that is configured to connect to another network device;

the processor is further configured to identify, according to a service configured on the virtualized remote logical interface, a service type of the service, and generate virtual link forwarding entries of the remote access node and a core aggregation node, where the virtual link forwarding entry includes a virtual link forwarding entry of the core aggregation node and a virtual link forwarding entry of the remote access node, an interface of an attachment circuit (Attachment Circuit) in the virtual link forwarding entry of the core aggregation node is the virtualized remote logical interface, and an interface of an attachment circuit in the virtual link forwarding entry of the remote access node is the external interface; and the processor is further configured to send the virtual link forwarding entry to the remote access node and the core aggregation node through the at least one communications interface, so as to set up a virtual link between the core aggregation node and the remote access node.

With reference to the fifth aspect, in a first possible implementation manner, the processor is further configured to generate a service forwarding entry of the core aggregation node by performing centralized calculation according to the service configured on the virtualized remote logical interface and a service protocol of the service to be processed, and send the service forwarding entry to the core aggregation node through the at least one communications interface, where an outbound interface of the service forwarding entry is the virtualized remote logical interface.

With reference to the first possible implementation manner, in a second possible implementation manner, the service forwarding entry includes a unicast Internet Protocol IP routing and forwarding entry, a Layer 3 virtual private network L3VPN routing and forwarding entry, or a Layer 2 virtual private network L2VPN forwarding entry.

With reference to the fifth aspect, the first possible implementation manner, or the second possible implementation manner, in a third possible implementation manner, the processor is further configured to send the virtual link forwarding entry to the core aggregation node through a control channel between the control device and the core aggregation node and through the at least one communications interface, and send, by using the control device, the virtual link forwarding entry to the remote access node through a control channel between the remote access node and the core aggregation node.

With reference to the fifth aspect, the first possible implementation manner, the second possible implementation manner, or the third possible implementation manner, in a fourth possible implementation manner, the core aggregation node includes a core aggregation node as a main frame and a core aggregation node as a backup frame; and the core aggregation node as a main frame and the core aggregation node as a backup frame share the control device, where the processor is specifically further configured to send the virtual link forwarding entry to the remote access node, the core aggregation node as a main frame, and the core aggregation node as a backup frame through the at least one communications interface.

With reference to the fourth possible implementation manner, in a fifth possible implementation manner, the processor is further configured to set a routing entry in a first service forwarding entry that is generated for the core aggregation node as a main frame as a primary route, and send the first service forwarding entry to the core aggregation node as a main frame through the at least one communications interface; and the processor is further configured to set a routing entry in a second service forwarding entry that is generated for the core aggregation node as a backup frame as a secondary route, and send the second service forwarding entry to the core aggregation node as a backup frame through the at least one communications interface.

According to a sixth aspect, a core aggregation node is provided, including: a processor and a memory that are connected by using a data bus, and a communications port that is separately connected to the processor and the memory, where:

the processor is configured to create, on the core aggregation node, a virtualized remote logical interface for an external interface of a remote access node, where the external interface of the remote access node is an interface that is configured to connect to another network device;

the processor is further configured to identify, according to a service configured on the virtualized remote logical interface, a service type of the service, and generate virtual link forwarding entries of the remote access node and the core aggregation node, where the virtual link forwarding entry includes a virtual link forwarding entry of the core aggregation node and a virtual link forwarding entry of the remote access node, and an interface of an attachment circuit (Aattachment Circuit) in the virtual link forwarding entry of the core aggregation node is the virtualized remote logical interface; and the processor is further configured to store the virtual link forwarding entry of the core aggregation node, and send the virtual link forwarding entry of the remote access node to the remote access node, so as to set up a virtual link between the core aggregation node and the remote access node.

With reference to the sixth aspect, in a first possible implementation manner, the processor is further configured to generate a service forwarding entry of the core aggregation node by performing centralized calculation according to the service configured on the virtualized remote logical interface and a service protocol of the service to be processed, and store the service forwarding entry, where an outbound interface of the service forwarding entry is the virtualized remote logical interface.

With reference to the first possible implementation manner, in a second possible implementation manner, the service forwarding entry includes a unicast Internet Protocol IP routing and forwarding entry, a Layer 3 virtual private network L3VPN routing and forwarding entry, or a Layer 2 virtual private network L2VPN forwarding entry.

With reference to the sixth aspect, the first possible implementation manner, or the second possible implementation manner, in a third possible implementation manner, the processor is further configured to send the virtual link forwarding entry to the remote access node through a control channel between the remote access node and the core aggregation node and through the at least one communications interface.

With reference to the sixth aspect, the first possible implementation manner, the second possible implementation manner, or the third possible implementation manner, in a fourth possible implementation manner, the core aggregation node includes a core aggregation node as a main frame and a core aggregation node as a backup frame, where the processor is specifically further configured to send the virtual link forwarding entry to the remote access node and the core aggregation node as a backup frame through the at least one communications interface.

With reference to the fourth possible implementation manner, in a fifth possible implementation manner, the processor is further configured to set a routing entry in a first service forwarding entry that is generated for the core aggregation node as a main frame as a primary route, and store the first service forwarding entry; and set, by using the core aggregation node as a main frame, a routing entry in a second service forwarding entry that is generated for the core aggregation node as a backup frame as a secondary route, and send the second service forwarding entry to the core aggregation node as a backup frame.

According to a seventh aspect, a routing system is provided, including: at least two core aggregation nodes, a plurality of remote access nodes separately connected to the core aggregation nodes, and at least one control device connected to any one of the core aggregation nodes, where the control device is any control device according to the third aspect, or the control device is any control device according to the fifth aspect.

According to an eighth aspect, a routing system is provided, including: at least one core aggregation node and a remote access node connected to the at least one core aggregation node, where the core aggregation node is any core aggregation node according to the fourth aspect, or the core aggregation node is any core aggregation node according to the sixth aspect.

According to the method, the device, and the routing system for data transmission of network virtualization provided by the embodiments of the application, a virtual link is set up between a core aggregation node and a remote access node, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

BRIEF DESCRIPTION OF THE DRAWINGS

To describe the technical solutions in the embodiments of the application or in the prior art more clearly, the following briefly introduces the accompanying drawings required for describing the embodiments or the prior art. Apparently, the accompanying drawings in the following description show merely some embodiments of the application, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the application with reference to the accompanying drawings in the embodiments of the application. Apparently, the described embodiments are merely a part rather than all of the embodiments of the application. All other embodiments obtained by a person of ordinary skill in the art based on the embodiments of the application without creative efforts shall fall within the protection scope of the application.

Figure 1:
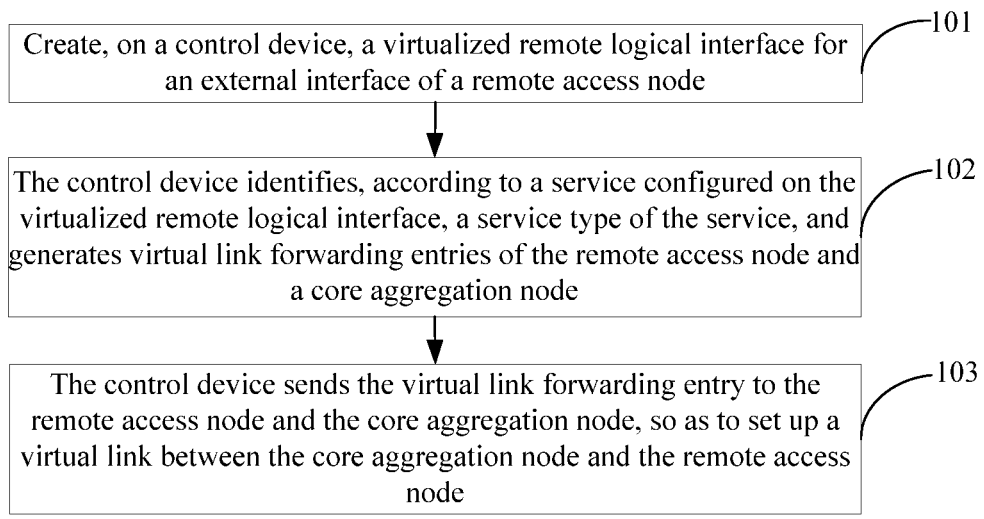
FIG. 1 is a schematic flowchart of a method for data transmission of network virtualization according to an embodiment of the application.

An embodiment of the application provides a method for data transmission of network virtualization. The method is described based on an example of a virtual cluster, and is implemented on a separation of control and forwarding plane of the virtual cluster, where a virtual cluster routing system is generally formed by a plurality of remote access nodes APs (Access Point, AP for short) and several core aggregation nodes Masters, the remote access nodes generally are devices such as low-end routers or switches having only a forwarding function and no control function, and the Masters may be devices such as routers or switches having large capacities and high performance. The application is established in such an architecture, and specific embodiments are as follows:

The application provides a method for data transmission of network virtualization, which is applied to a control device. As shown in FIG. 1, the method includes the following processes:

101. Create, on a control device, a virtualized remote logical interface for an external interface of a remote access node.

The external interface of the remote access node is an interface that is configured to connect to another network device.

102. The control device identifies, according to a service configured on the virtualized remote logical interface, a service type of the service, and generates virtual link forwarding entries of the remote access node and a core aggregation node.

The virtual link forwarding entry includes a virtual link forwarding entry of the core aggregation node and a virtual link forwarding entry of the remote access node.

An interface of an attachment circuit (Attachment Circuit) in the virtual link forwarding entry of the core aggregation node is the virtualized remote logical interface, and an interface of an attachment circuit in the virtual link forwarding entry of the remote access node is the external interface.

Further, the control device generates a service forwarding entry of the core aggregation node by performing centralized calculation according to the service configured on the virtualized remote logical interface and a service protocol of the service to be processed, and sends the service forwarding entry to the core aggregation node, where an outbound interface of the service forwarding entry is the virtualized remote logical interface.

Specifically, the service forwarding entry includes a unicast Internet Protocol IP routing and forwarding entry, a Layer 3 virtual private network L3VPN routing and forwarding entry, or a Layer 2 virtual private network L2VPN forwarding entry.

In this embodiment of the application, a PW (Pseudo wire) forwarding entry is used as an example of the virtual link forwarding entry herein; in an actual situation, the application is further applicable to other types of virtual link forwarding entries.

103. The control device sends the virtual link forwarding entry to the remote access node and the core aggregation node, so as to set up a virtual link between the core aggregation node and the remote access node.

According to the method for data transmission of network virtualization provided by this embodiment of the application, a virtual link is set up between a core aggregation node and a remote access node, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Figure 2:
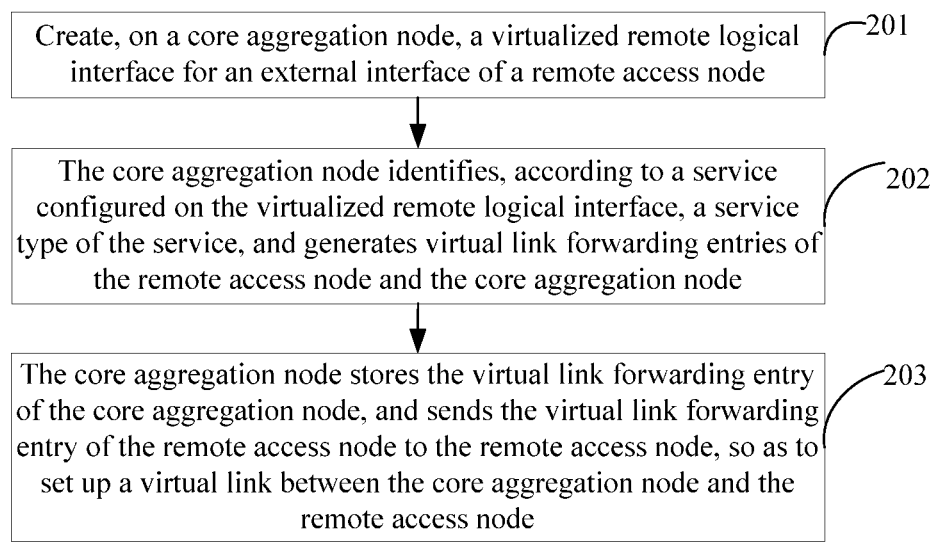
FIG. 2 is a schematic flowchart of another method for data transmission of network virtualization according to an embodiment of the application.

The application provides another method for data transmission of network virtualization, which is applied to a core aggregation node. As shown in FIG. 2, the method includes the following processes:

201. Create, on a core aggregation node, a virtualized remote logical interface for an external interface of a remote access node.

The external interface of the remote access node is an interface that is configured to connect to another network device.

202. The core aggregation node identifies, according to a service configured on the virtualized remote logical interface, a service type of the service, and generates virtual link forwarding entries of the remote access node and the core aggregation node.

The virtual link forwarding entry herein includes a virtual link forwarding entry of the core aggregation node and a virtual link forwarding entry of the remote access node, where an interface of an attachment circuit (Aattachment Circuit) in the virtual link forwarding entry of the core aggregation node is the virtualized remote logical interface.

Further, the core aggregation node generates a service forwarding entry of the core aggregation node by performing centralized calculation according to the service configured on the virtualized remote logical interface and a service protocol of the service to be processed, and stores the service forwarding entry, where an outbound interface of the service forwarding entry is the virtualized remote logical interface.

Specifically, the service forwarding entry includes a unicast Internet Protocol IP routing and forwarding entry, a Layer 3 virtual private network L3VPN routing and forwarding entry, or a Layer 2 virtual private network L2VPN forwarding entry.

In this embodiment of the application, a PW (Pseudo wire) forwarding entry is used as an example of the virtual link forwarding entry herein; in an actual situation, the application is further applicable to other types of virtual link forwarding entries.

203. The core aggregation node stores the virtual link forwarding entry of the core aggregation node, and sends the virtual link forwarding entry of the remote access node to the remote access node, so as to set up a virtual link between the core aggregation node and the remote access node.

According to the method for data transmission of network virtualization provided by this embodiment of the application, a virtual link is set up between a core aggregation node and a remote access node, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Specifically, the following gives description with reference to specific embodiments.

Figure 3:
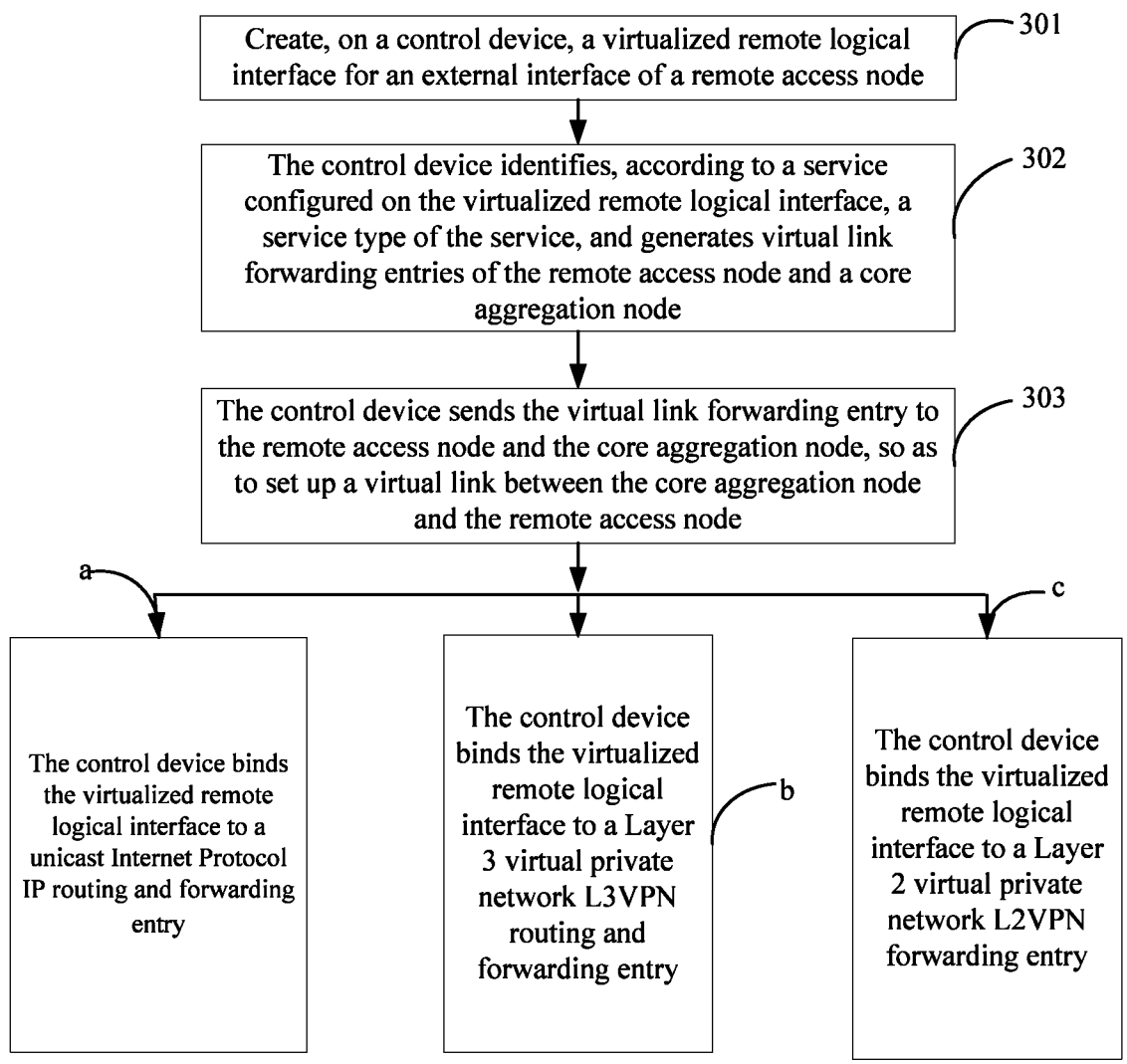
FIG. 3 is a schematic flowchart of a method for data transmission of network virtualization according to another embodiment of the application.

On the basis of the embodiments shown in FIG. 1 and FIG. 2, as shown in FIG. 3, an embodiment of the application provides a method for data transmission of network virtualization, that is, provides a method that, in a scenario of a plurality of Masters, a control device identifies, according to a service configured on a virtualized remote logical interface, a service type of the service, and generates virtual link forwarding entries of a remote access node and a core aggregation node, so as to set up a virtual link between the core aggregation node and the remote access node, which mainly includes: identifying, according to the service configured on the virtualized remote logical interface, the service type of the service, and generating the virtual link forwarding entries of the remote access node and the core aggregation node. As shown in FIG. 3, FIG. 3 shows a process of setting up a virtual link between a core aggregation node and a remote access node; and specific steps are as follows:

301. Create, on a control device, a virtualized remote logical interface for an external interface of the remote access node.

The external interface of the remote access node is an interface that is configured to connect to another network device.

302. The control device identifies, according to a service configured on the virtualized remote logical interface, a service type of the service, and generates virtual link forwarding entries of the remote access node and the core aggregation node.

The virtual link forwarding entry includes a virtual link forwarding entry of the core aggregation node and a virtual link forwarding entry of the remote access node.

An interface of an attachment circuit (Attachment Circuit) in the virtual link forwarding entry of the core aggregation node is the virtualized remote logical interface, and an interface of an attachment circuit in the virtual link forwarding entry of the remote access node is the external interface.

Further, the control device generates a service forwarding entry of the core aggregation node by performing centralized calculation according to the service configured on the virtualized remote logical interface and a service protocol of the service to be processed, and sends the service forwarding entry to the core aggregation node, where an outbound interface of the service forwarding entry is the virtualized remote logical interface.

Specifically, the service forwarding entry includes a unicast Internet Protocol IP routing and forwarding entry, a Layer 3 virtual private network L3VPN routing and forwarding entry, or a Layer 2 virtual private network L2VPN forwarding entry.

In this embodiment of the application, a PW (Pseudo wire) forwarding entry is used as an example of the virtual link forwarding entry herein; in an actual situation, the application is further applicable to other types of virtual link forwarding entries.

303. The control device sends the virtual link forwarding entry to the remote access node and the core aggregation node, so as to set up a virtual link between the core aggregation node and the remote access node.

Further, the control device sends the virtual link forwarding entry to the core aggregation node through a control channel between the control device and the core aggregation node, and the control device sends the virtual link forwarding entry to the remote access node through a control channel between the remote access node and the core aggregation node.

In the foregoing step 302 and step 303, a scenario of two Masters is used as an example. The core aggregation node is classified into a main Master and a backup Master, and control devices of the main Master and the backup Master, separately generate a virtual link forwarding entry through calculation and deliver the virtual link forwarding entry, so as to set up a point-to-point virtual link between the core aggregation node and the remote access node.

The control device of the main Master generates the virtual link forwarding entries of the remote access node and the main Master through calculation, delivers the virtual link forwarding entry of the main Master to the main Master; in addition, the main Master delivers the virtual link forwarding entry of the remote access node AP to the remote access node AP through a control channel between the remote access node AP (Access Point, AP for short) and the backup Master, where the control channel refers to a channel that is inside a virtual cluster and responsible for processing a packet such as a control and management protocol between the remote access node and the main Master or between the remote access node and the backup Master.

A manner in which the backup Master calculates and sends the virtual link forwarding entry is the same as the foregoing manner, where the control device of the backup Master generates the virtual link forwarding entries of the backup Master and the remote AP through calculation, delivers the virtual link forwarding entry to the backup Master, and delivers the virtual link forwarding entry of the remote AP to the remote AP through the control channel between the backup Master and the remote AP.

For a specifically processed service protocol, the method further includes:

a. the control device binds the virtualized remote logical interface to a unicast Internet Protocol IP routing and forwarding entry, where an outbound interface in the unicast IP routing and forwarding entry is the virtualized remote logical interface that is created on the core aggregation node for the external interface of the remote access node;

or, b. the control device binds the virtualized remote logical interface to a Layer 3 virtual private network L3VPN routing and forwarding entry, where an outbound interface in the L3VPN routing and forwarding entry is the virtualized remote logical interface that is created on the core aggregation node for the external interface of the remote access node;

or, c. the control device binds the virtualized remote logical interface to a Layer 2 virtual private network L2VPN forwarding entry.

In this embodiment of the application, when processing the L2VPN forwarding entry, the control device binds the virtualized remote logical interface to an attachment circuit (Attachment Circuit, AC for short) interface table of the L2VPN forwarding entry; in this embodiment of the application, the attachment circuit AC interface table of the L2VPN forwarding entry is used as an example; however, in an actual process, it is not limited to the manner of binding to the attachment circuit AC interface table.

An outbound interface in the L2VPN forwarding entry is the virtualized remote logical interface that is created on the core aggregation node for the external interface of the remote access node.

According to the method for data transmission of network virtualization provided by this embodiment of the application, a virtual link is set up between a core aggregation node and a remote access node through calculation inside the core aggregation node, and a routing and forwarding entry of a corresponding service protocol is forwarded through the virtual link, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Figure 4:
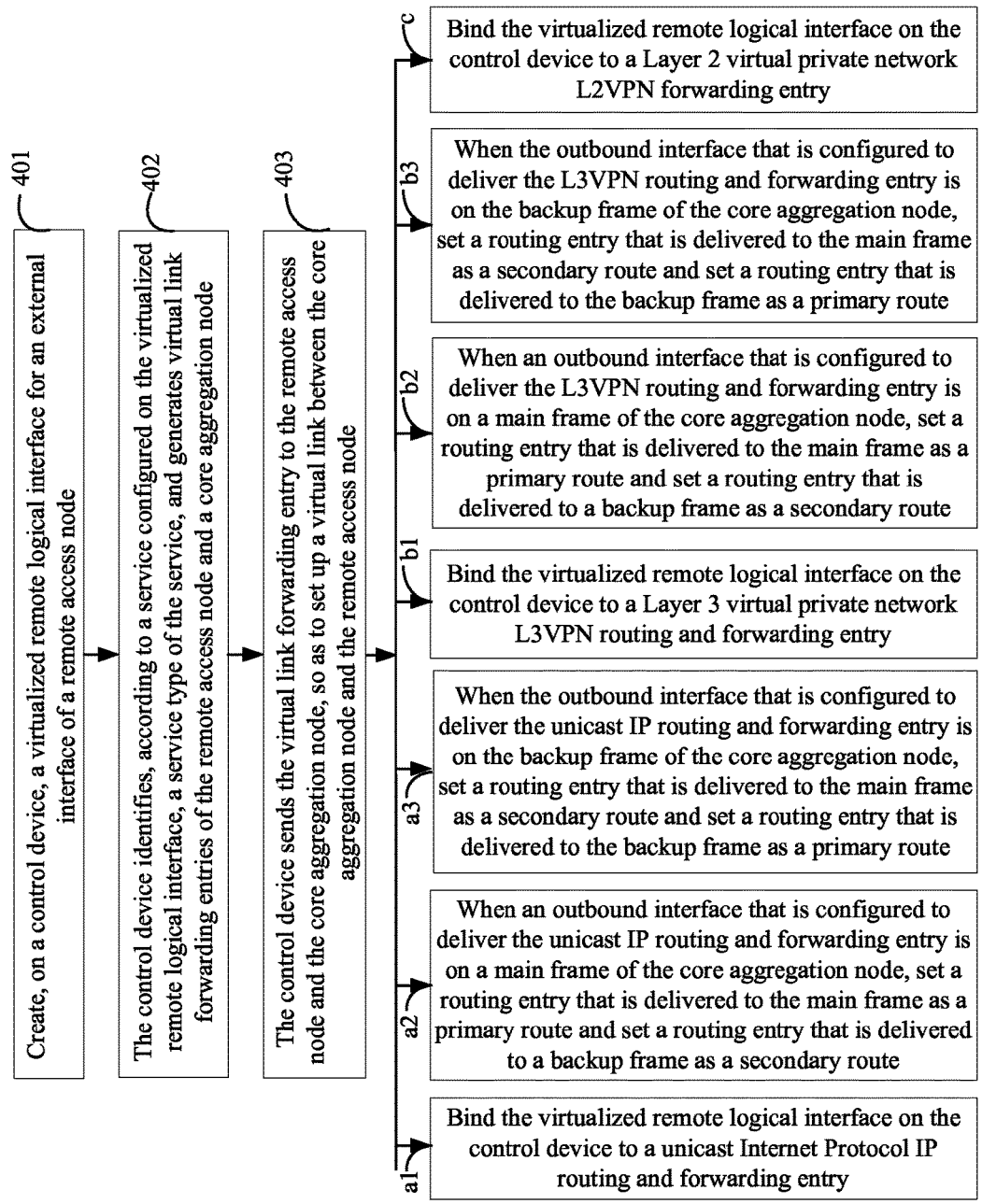
FIG. 4 is a schematic flowchart of another method for data transmission of network virtualization according to another embodiment of the application.

On the basis of the embodiments shown in FIG. 1 and FIG. 2, as shown in FIG. 4, an embodiment of the application provides a method for data transmission of network virtualization, that is, provides a method that, in a scenario of a single Master, a control device identifies, according to a service configured on a virtualized remote logical interface, a service type of the service, and generates virtual link forwarding entries of a remote access node and a core aggregation node, so as to set up a virtual link between the core aggregation node and the remote access node, which mainly includes: identifying, according to the service configured on the virtualized remote logical interface, the service type of the service, and generating the virtual link forwarding entries of the remote access node and the core aggregation node. As shown in FIG. 4, FIG. 4 shows a process of setting up a virtual link between a core aggregation node and a remote access node; and specific steps are as follows:

401. Create, on a control device, a virtualized remote logical interface for an external interface of the remote access node.

The external interface of the remote access node is an interface that is configured to connect to another network device.

402. The control device identifies, according to a service configured on the virtualized remote logical interface, a service type of the service, and generates virtual link forwarding entries of the remote access node and the core aggregation node.

The virtual link forwarding entry includes a virtual link forwarding entry of the core aggregation node and a virtual link forwarding entry of the remote access node.

An interface of an attachment circuit (Attachment Circuit) in the virtual link forwarding entry of the core aggregation node is the virtualized remote logical interface, and an interface of an attachment circuit in the virtual link forwarding entry of the remote access node is the external interface.

Further, the control device generates a service forwarding entry of the core aggregation node by performing centralized calculation according to the service configured on the virtualized remote logical interface and a service protocol of the service to be processed, and sends the service forwarding entry to the core aggregation node, where an outbound interface of the service forwarding entry is the virtualized remote logical interface.

Specifically, the service forwarding entry includes a unicast Internet Protocol IP routing and forwarding entry, a Layer 3 virtual private network L3VPN routing and forwarding entry, or a Layer 2 virtual private network L2VPN forwarding entry.

In this embodiment of the application, a PW (Pseudo wire) forwarding entry is used as an example of the virtual link forwarding entry herein; in an actual situation, the application is further applicable to other types of virtual link forwarding entries.

403. The control device sends the virtual link forwarding entry to the remote access node and the core aggregation node, so as to set up a virtual link between the core aggregation node and the remote access node.

Further, the core aggregation node includes a core aggregation node as a main frame and a core aggregation node as a backup frame; and the core aggregation node as a main frame and the core aggregation node as a backup frame share the control device, where that the control device sends the virtual link forwarding entry to the remote access node and the core aggregation node specifically includes: sending, by the control device, the virtual link forwarding entry to the remote access node, the core aggregation node as a main frame, and the core aggregation node as a backup frame.

Specifically, that the control device sends the service forwarding entry to the core aggregation node includes: setting a routing entry in a first service forwarding entry that is generated for the core aggregation node as a main frame as a primary route, and sending the first service forwarding entry to the core aggregation node as a main frame; and setting a routing entry in a second service forwarding entry that is generated for the core aggregation node as a backup frame as a secondary route, and sending the second service forwarding entry to the core aggregation node as a backup frame.

For a specifically processed service protocol, the method further includes:

a1. bind the virtualized remote logical interface on the control device to a unicast Internet Protocol IP routing and forwarding entry, where an outbound interface in the unicast Internet Protocol IP (Internet Protocol, IP for short) routing and forwarding entry is the virtualized remote logical interface that is created on the core aggregation node for the external interface of the remote access node; and herein, the virtualized remote logical interface on the core aggregation node is bound to the unicast Internet Protocol IP routing and forwarding entry, so that in a subsequent data transmission process, the core aggregation node sends, by querying the unicast IP routing and forwarding entry on the virtualized remote logical interface, unicast IP service data to the remote access node through the virtual link between the core aggregation node and the remote access node;

a2. when an outbound interface that is configured to deliver the unicast IP routing and forwarding entry is on a main frame of the core aggregation node, set a routing entry that is delivered to the main frame as a primary route and set a routing entry that is delivered to a backup frame as a secondary route, where herein, the outbound interface that is configured to deliver the unicast IP routing and forwarding entry may also be a common external interface on the main frame of the core aggregation node; and a3. when the outbound interface that is configured to deliver the unicast IP routing and forwarding entry is on the backup frame of the core aggregation node, set a routing entry that is delivered to the main frame as a secondary route and set a routing entry that is delivered to the backup frame as a primary route, where herein, when the methods of step a2 and step a3 are applied by the core aggregation node to process unicast IP routing and forwarding, inter-frame traffic waste between the main frame and the backup frame is avoided or reduced; the remote access node sends, by querying the virtual link forwarding entry, service data to the core aggregation node through the virtual link between the remote access node and the core aggregation node; and the core aggregation node receives, through the virtual link between the core aggregation node and the remote access node, the service data that is sent by the remote access node, acquires that the service data is unicast IP service data by querying the unicast IP routing and forwarding entry, and sends the unicast IP service data through the external interface of the core aggregation node;

or, b1. bind the virtualized remote logical interface on the control device to a Layer 3 virtual private network L3VPN routing and forwarding entry, where an outbound interface in the L3VPN routing and forwarding entry is the virtualized remote logical interface that is created on the core aggregation node for the external interface of the remote access node; and herein, the virtualized remote logical interface on the core aggregation node is bound to the L3VPN routing and forwarding entry, so that in a subsequent data transmission process, the core aggregation node sends, by querying the L3VPN routing and forwarding entry on the virtualized remote logical interface, L3VPN service data to the remote access node through the virtual link between the core aggregation node and the remote access node;

b2. when an outbound interface that is configured to deliver the L3VPN routing and forwarding entry is on a main frame of the core aggregation node, set a routing entry that is delivered to the main frame as a primary route and set a routing entry that is delivered to a backup frame as a secondary route, where herein, the outbound interface that is configured to deliver the L3VPN routing and forwarding entry may also be a common external interface on the main frame of the core aggregation node; and b3. when the outbound interface that is configured to deliver the L3VPN routing and forwarding entry is on the backup frame of the core aggregation node, set a routing entry that is delivered to the main frame as a secondary route and set a routing entry that is delivered to the backup frame as a primary route, where specifically, when the methods of step b2 and step b3 are applied by the core aggregation node to process L3VPN routing and forwarding, inter-frame traffic waste between the main frame and the backup frame is avoided or reduced; the remote access node sends, by querying the virtual link forwarding entry, service data to the core aggregation node through the virtual link between the remote access node and the core aggregation node; the core aggregation node receives, through the virtual link between the core aggregation node and the remote access node, the service data that is sent by the remote access node, acquires that the service data is L3VPN service data by querying the L3VPN routing and forwarding entry, and sends the L3VPN service data through the external interface of the core aggregation node; and the L3VPN (Layer 3 virtual private network, Layer 3 Virtual Private Network) herein is a multi-protocol label switching virtual private network (Multi-Protocol Label Switching Virtual Private Network, MPLS VPN for short) solution based on a routing manner, where a routing and forwarding entry in the L3VPN routing and forwarding entry is VRF, the VRF (Virtual Routing Forwarding, virtual routing and forwarding table) herein refers to VPN routing and forwarding (VRF), which is a technology used in a computer network, so that a plurality of instances of a routing table exists in a same router at the same time; because the routing instances are independent, same or overlapping IP addresses may be used without conflicting with each other;

or, c. bind the virtualized remote logical interface on the control device to a Layer 2 virtual private network L2VPN forwarding entry.

An outbound interface in the L2VPN forwarding entry is the virtualized remote logical interface that is created on the core aggregation node for the external interface of the remote access node.

The control device herein separately generates an external L2VPN forwarding entry of a network virtualization system for a main frame and a backup frame of the core aggregation node, and separately delivers the L2VPN forwarding entries to the main frame and the backup frame; the main frame and the backup frame separately completes join processing on a virtual link outside the network virtualization system and a virtual link inside the network virtualization system.

The join processing on a virtual link outside the network virtualization system and a virtual link inside the network virtualization system is joining a connection of L2VPN service data between a downlink virtual link inside the network virtualization system and the virtual link outside the network virtualization system, and a connection of the L2VPN service data between an uplink virtual link inside the network virtualization system and the virtual link outside the network virtualization system.

Specifically, a data transmission process of the L2VPN service data between the downlink virtual link inside the network virtualization system and the virtual link outside the network virtualization system is as follows: When the control device processes an L2VPN service, the control device generates L2VPN forwarding entries separately corresponding to the main frame and the backup frame, sends the L2VPN forwarding entry corresponding to the main frame to the main frame through a control channel between the control device and the main frame, and sends the L2VPN forwarding entry corresponding to the backup frame to the backup frame through a control channel between the control device and the backup frame; the core aggregation node acquires that the outbound interface is the virtualized remote logical interface by querying an L2VPN routing and forwarding entry, maps to and associates with the virtual link inside the network virtualization system by means of the virtualized remote logical interface, and sends the service data to the remote access node through the virtual link; and the remote access node sends, by querying a virtual link forwarding table, the service data to the outside of the network virtualization system through an external outbound interface (that is, an AC interface).

A data transmission process of the L2VPN service data between the uplink virtual link inside the network virtualization system and the virtual link outside the network virtualization system is as follows: When processing L2VPN service data forwarding, the core aggregation node selects an optimal path to transfer the data, so as to avoid or reduce inter-frame traffic waste between the main frame and the backup frame; the remote access node receives the service data through an external interface (that is, an AC interface), and sends, by querying the virtual link forwarding entry, the service data to the main frame or the backup frame of a corresponding core aggregation node through the virtual link between the remote access node and the core aggregation node; and the core aggregation node receives, through the virtual link between the core aggregation node and the remote access node, the service data that is sent by the remote access node, acquires that the service data is L2VPN service data by querying the L2VPN routing entry, and sends the L2VPN service data to the outside of the network virtualization system through an external interface of the main frame or backup frame of the core aggregation node.

In this embodiment of the application, when processing the L2VPN forwarding entry, the control device binds the virtualized remote logical interface to an attachment circuit AC (Attachment circuit) interface table of the L2VPN forwarding entry. In this embodiment of the application, the attachment circuit AC interface table of the L2VPN forwarding entry is used as an example herein; however, in an actual process, it is not limited to the manner of binding to the attachment circuit AC interface table.

The L2VPN (Layer 2 virtual private network, Layer 2 Virtual Private Network) herein is to transparently transmit Layer 2 data of a user on a PSN (IP/MPLS) network. Seen from a perspective of a user, the PSN network herein is a Layer 2 switched network, and a Layer 2 connection may be set up between different sites by using this network.

According to the method for data transmission of network virtualization provided by this embodiment of the application, a virtual link is set up between a core aggregation node and a remote access node, a core aggregation node as a main frame and a core aggregation node as a backup frame are exchanged in terms of function during an actual operation, and a routing and forwarding entry of a corresponding service protocol is forwarded to the core aggregation node through the virtual link that is set up, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Figure 5:
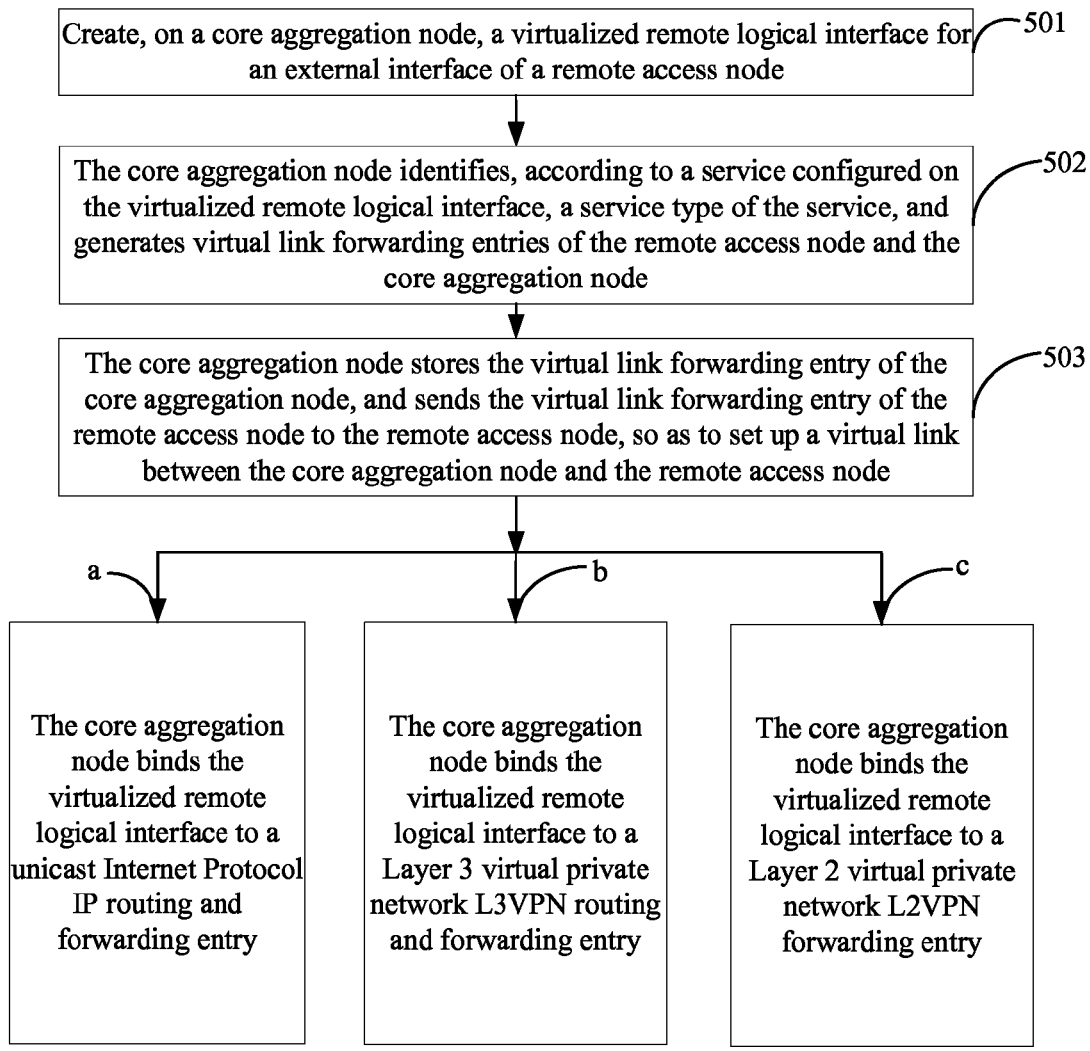
FIG. 5 is a schematic flowchart of a method for data transmission of network virtualization according to still another embodiment of the application.

On the basis of the embodiments shown in FIG. 1 and FIG. 2, as shown in FIG. 5, an embodiment of the application provides a method for data transmission of network virtualization, that is, provides a method that, in a scenario of a plurality of Masters, a core aggregation node identifies, according to a service configured on a virtualized remote logical interface, a service type of the service, and generates virtual link forwarding entries of a remote access node and the core aggregation node, so as to set up a virtual link between the core aggregation node and the remote access node, which mainly includes: identifying, according to the service configured on the virtualized remote logical interface, the service type of the service, and generating the virtual link forwarding entries of the remote access node and the core aggregation node. As shown in FIG. 5, FIG. 5 shows a process of setting up a virtual link between the core aggregation node and the remote access node; and specific steps are as follows:

501. Create, on the core aggregation node, a virtualized remote logical interface for an external interface of the remote access node.

The external interface of the remote access node is an interface that is configured to connect to another network device.

502. The core aggregation node identifies, according to the service configured on the virtualized remote logical interface, the service type of the service, and generates the virtual link forwarding entries of the remote access node and the core aggregation node.

The virtual link forwarding entry herein includes a virtual link forwarding entry of the core aggregation node and a virtual link forwarding entry of the remote access node, where an interface of an attachment circuit (Aattachment Circuit) in the virtual link forwarding entry of the core aggregation node is the virtualized remote logical interface.

Further, the core aggregation node generates a service forwarding entry of the core aggregation node by performing centralized calculation according to the service configured on the virtualized remote logical interface and a service protocol of the service to be processed, and stores the service forwarding entry, where an outbound interface of the service forwarding entry is the virtualized remote logical interface.

Specifically, the service forwarding entry includes a unicast Internet Protocol IP routing and forwarding entry, a Layer 3 virtual private network L3VPN routing and forwarding entry, or a Layer 2 virtual private network L2VPN forwarding entry.

In this embodiment of the application, a PW (Pseudo wire) forwarding entry is used as an example of the virtual link forwarding entry herein; in an actual situation, the application is further applicable to other types of virtual link forwarding entries.

503. The core aggregation node stores the virtual link forwarding entry of the core aggregation node, and sends the virtual link forwarding entry of the remote access node to the remote access node, so as to set up the virtual link between the core aggregation node and the remote access node.

Further, the core aggregation node sends the virtual link forwarding entry to the remote access node through a control channel between the remote access node and the core aggregation node.

In the foregoing step 502 and step 503, a scenario of two Masters is used as an example. The core aggregation node is classified into a main Master and a backup Master, and control devices of the main Master and the backup Master separately generate a virtual link forwarding entry through calculation and deliver the virtual link forwarding entry, so as to set up a point-to-point virtual link between the core aggregation node and the remote access node.

a. the core aggregation node binds the virtualized remote logical interface to a unicast Internet Protocol IP routing and forwarding entry, where an outbound interface in the unicast IP routing and forwarding entry is the virtualized remote logical interface that is created on the core aggregation node for the external interface of the remote access node.

or, b. the core aggregation node binds the virtualized remote logical interface to a Layer 3 virtual private network L3VPN routing and forwarding entry, where an outbound interface in the L3VPN routing and forwarding entry is the virtualized remote logical interface that is created on the core aggregation node for the external interface of the remote access node;

or, c. the core aggregation node binds the virtualized remote logical interface to a Layer 2 virtual private network L2VPN forwarding entry.

In this embodiment of the application, when processing the L2VPN forwarding entry, the control device binds the virtualized remote logical interface to an attachment circuit (Attachment Circuit, AC for short) interface table of the L2VPN forwarding entry. In this embodiment of the application, the attachment circuit AC interface table of the L2VPN forwarding entry is used as an example herein; however, in an actual process, it is not limited to the manner of binding to the attachment circuit AC interface table.

An outbound interface in the L2VPN forwarding entry is the virtualized remote logical interface that is created on the core aggregation node for the external interface of the remote access node.

According to the method for data transmission of network virtualization provided by this embodiment of the application, a virtual link is set up between a core aggregation node and a remote access node through calculation inside the core aggregation node, and a routing and forwarding entry of a corresponding service protocol is forwarded through the virtual link, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Figure 6:
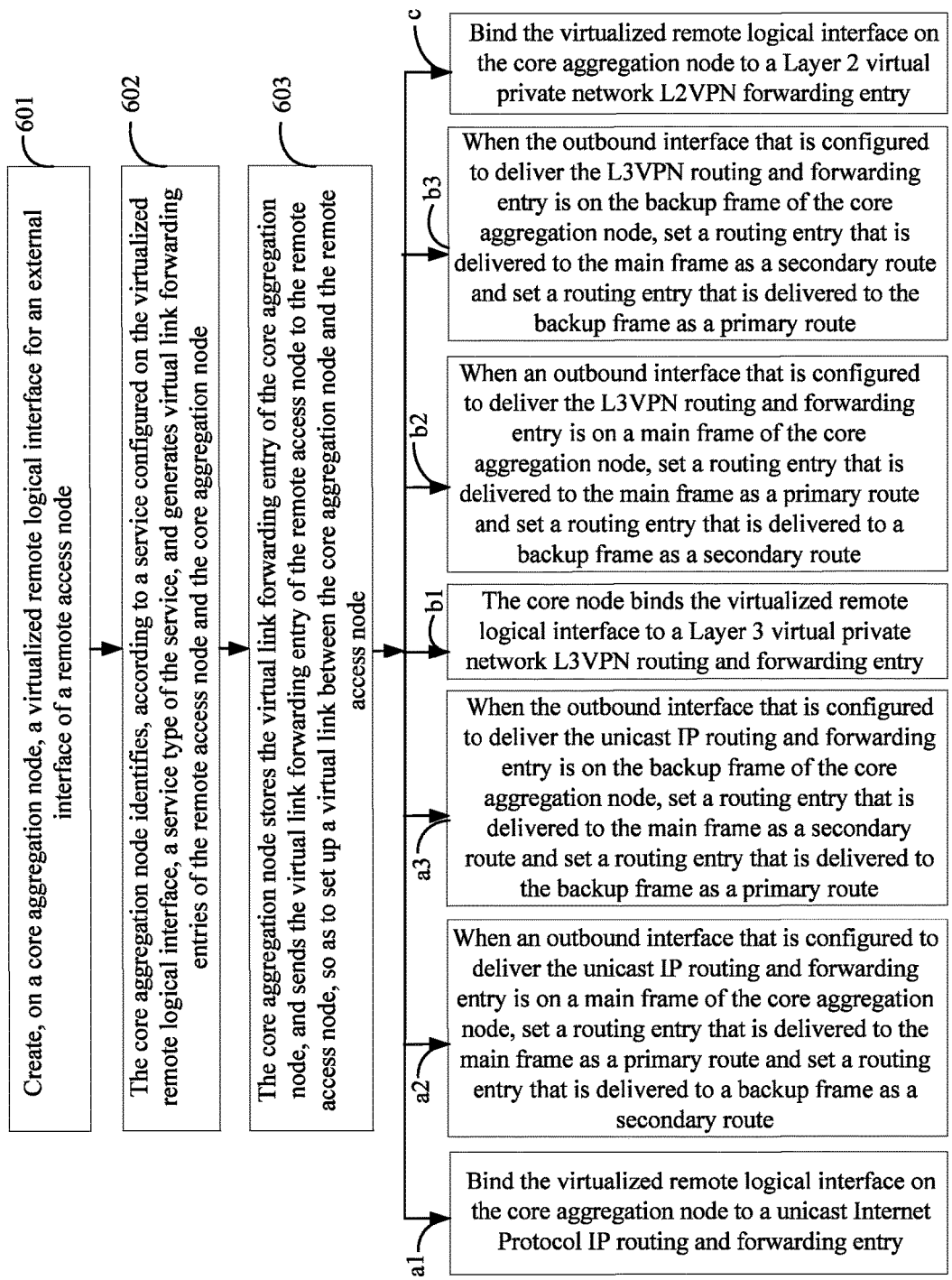
FIG. 6 is a schematic flowchart of another method for data transmission of network virtualization according to still another embodiment of the application.

On the basis of the embodiments shown in FIG. 1 and FIG. 2, as shown in FIG. 6, an embodiment of the application provides a method for data transmission of network virtualization, that is, provides a method that, in a scenario of a single Master, a core aggregation node identifies, according to a service configured on a virtualized remote logical interface, a service type of the service, and generates virtual link forwarding entries of a remote access node and the core aggregation node, so as to set up a virtual link between the core aggregation node and the remote access node, which mainly includes: identifying, according to the service configured on the virtualized remote logical interface, the service type of the service, and generating the virtual link forwarding entries of the remote access node and the core aggregation node. As shown in FIG. 6, FIG. 6 shows a process of setting up a virtual link between a core aggregation node and a remote access node; and specific steps are as follows:

601. Create, on a core aggregation node, a virtualized remote logical interface for an external interface of a remote access node.

The external interface of the remote access node is an interface that is configured to connect to another network device.

602. The core aggregation node identifies, according to a service configured on the virtualized remote logical interface, a service type of the service, and generates virtual link forwarding entries of the remote access node and the core aggregation node.

The virtual link forwarding entry herein includes a virtual link forwarding entry of the core aggregation node and a virtual link forwarding entry of the remote access node, where an interface of an attachment circuit (Aattachment Circuit) in the virtual link forwarding entry of the core aggregation node is the virtualized remote logical interface.

Further, the core aggregation node generates a service forwarding entry of the core aggregation node by performing centralized calculation according to the service configured on the virtualized remote logical interface and a service protocol of the service to be processed, and stores the service forwarding entry, where an outbound interface of the service forwarding entry is the virtualized remote logical interface.

Specifically, the service forwarding entry includes a unicast Internet Protocol IP routing and forwarding entry, a Layer 3 virtual private network L3VPN routing and forwarding entry, or a Layer 2 virtual private network L2VPN forwarding entry.

In this embodiment of the application, a PW (Pseudo wire) forwarding entry is used as an example of the virtual link forwarding entry herein; in an actual situation, the application is further applicable to other types of virtual link forwarding entries.

603. The core aggregation node stores the virtual link forwarding entry of the core aggregation node, and sends the virtual link forwarding entry of the remote access node to the remote access node, so as to set up a virtual link between the core aggregation node and the remote access node.

Further, the core aggregation node includes a core aggregation node as a main frame and a core aggregation node as a backup frame, where that the core aggregation node sends the virtual link forwarding entry to the remote access node specifically includes: sending, by the core aggregation node as a main frame, the virtual link forwarding entry to the remote access node and the core aggregation node as a backup frame.

Further, the core aggregation node as a main frame sets a routing entry in a first service forwarding entry that is generated for the core aggregation node as a main frame as a primary route, and stores the first service forwarding entry; and the core aggregation node as a main frame sets a routing entry in a second service forwarding entry that is generated for the core aggregation node as a backup frame as a secondary route, and sends the second service forwarding entry to the core aggregation node as a backup frame.

For a specifically processed service protocol, the method further includes:

a1. bind the virtualized remote logical interface on the core aggregation node to a unicast Internet Protocol IP routing and forwarding entry, where an outbound interface in the unicast Internet Protocol IP (Internet Protocol, IP for short) routing and forwarding entry is the virtualized remote logical interface that is created on the core aggregation node for the external interface of the remote access node; and herein, the virtualized remote logical interface on the core aggregation node is bound to the unicast Internet Protocol IP routing and forwarding entry, so that in a subsequent data transmission process, the core aggregation node sends, by querying the unicast IP routing and forwarding entry on the virtualized remote logical interface, unicast IP service data to the remote access node through the virtual link between the core aggregation node and the remote access node;

a2. when an outbound interface that is configured to deliver the unicast IP routing and forwarding entry is on a main frame of the core aggregation node, set a routing entry that is delivered to the main frame as a primary route and set a routing entry that is delivered to a backup frame as a secondary route, where herein, the outbound interface that is configured to deliver the unicast IP routing and forwarding entry may also be a common external interface on the main frame of the core aggregation node; and a3. when the outbound interface that is configured to deliver the unicast IP routing and forwarding entry is on the backup frame of the core aggregation node, set a routing entry that is delivered to the main frame as a secondary route and set a routing entry that is delivered to the backup frame as a primary route, where herein, when the methods of step a2 and step a3 are applied by the core aggregation node to process unicast IP routing and forwarding, inter-frame traffic waste between the main frame and the backup frame is avoided or reduced. The remote access node sends, by querying the virtual link forwarding entry, service data to the core aggregation node through the virtual link between the remote access node and the core aggregation node; the core aggregation node receives, through the virtual link between the core aggregation node and the remote access node, the service data that is sent by the remote access node, acquires that the service data is unicast IP service data by querying the unicast IP routing and forwarding entry, and sends the unicast IP service data through the external interface of the core aggregation node;

or, b1. bind the virtualized remote logical interface on the core aggregation node to a Layer 3 virtual private network L3VPN routing and forwarding entry, where an outbound interface in the L3VPN routing and forwarding entry is the virtualized remote logical interface that is created on the core aggregation node for the external interface of the remote access node; and herein, the virtualized remote logical interface on the core aggregation node is bound to the L3VPN routing and forwarding entry, so that in a subsequent data transmission process, the core aggregation node sends, by querying the L3VPN routing and forwarding entry on the virtualized remote logical interface, L3VPN service data to the remote access node through the virtual link between the core aggregation node and the remote access node;

b2. when an outbound interface that is configured to deliver the L3VPN routing and forwarding entry is on a main frame of the core aggregation node, set a routing entry that is delivered to the main frame as a primary route and set a routing entry that is delivered to a backup frame as a secondary route, where herein, the outbound interface that is configured to deliver the L3VPN routing and forwarding entry may also be a common external interface on the main frame of the core aggregation node; and b3. when the outbound interface that is configured to deliver the L3VPN routing and forwarding entry is on the backup frame of the core aggregation node, set a routing entry that is delivered to the main frame as a secondary route and set a routing entry that is delivered to the backup frame as a primary route, where specifically, when the methods of step b2 and step b3 are applied by the core aggregation node to process L3VPN routing and forwarding, inter-frame traffic waste between the main frame and the backup frame is avoided or reduced; the remote access node sends, by querying the virtual link forwarding entry, service data to the core aggregation node through the virtual link between the remote access node and the core aggregation node; and the core aggregation node receives, through the virtual link between the core aggregation node and the remote access node, the service data that is sent by the remote access node, acquires that the service data is L3VPN service data by querying the L3VPN routing and forwarding entry, and sends the L3VPN service data through the external interface of the core aggregation node; and the L3VPN (Layer 3 virtual private network, Layer3 Virtual Private Network) herein is a multi-protocol label switching virtual private network (Multi-Protocol Label Switching Virtual Private Network, MPLS VPN for short) solution based on a routing manner, where a routing and forwarding entry in the L3VPN routing and forwarding entry is VRF, the VRF (Virtual Routing Forwarding, virtual routing and forwarding table) herein refers to VPN routing and forwarding (VRF), which is a technology used in a computer network so that a plurality of instances of a routing table exists in a same router at the same time; because the routing instances are independent, same or overlapping IP addresses may be used without conflicting with each other; or, c. bind the virtualized remote logical interface on the core aggregation node to a Layer 2 virtual private network L2VPN forwarding entry.

An outbound interface in the L2VPN forwarding entry is the virtualized remote logical interface that is created on the core aggregation node for the external interface of the remote access node.

According to the method for data transmission of network virtualization provided by this embodiment of the application, a virtual link is set up between a core aggregation node and a remote access node, a core aggregation node as a main frame and a core aggregation node as a backup frame are exchanged in terms of function during an actual operation, and a routing and forwarding entry of a corresponding service protocol is forwarded to the core aggregation node through the virtual link that is set up, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Figure 7:
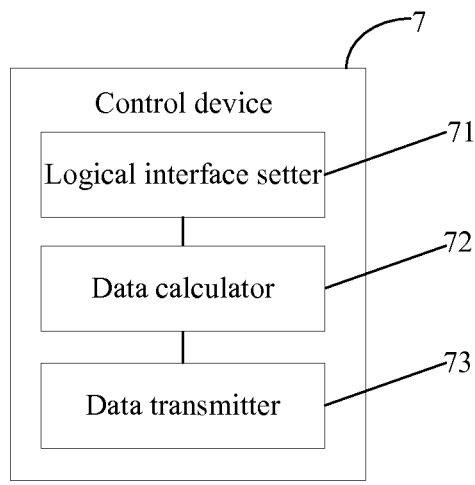
FIG. 7 is a schematic structural diagram of a control device according to an embodiment of the application.

An embodiment of the application provides a control device 7. As shown in FIG. 7, the control device 7 includes: a logical interface setter 71, a data calculator 72, and a data transmitter 73.

The logical interface setter 71 is configured to create, on the control device, a virtualized remote logical interface for an external interface of a remote access node, where the external interface of the remote access node is an interface that is configured to connect to another network device.

The data calculator 72 is configured to identify, according to a service configured on the virtualized remote logical interface that is created by the logical interface setter, a service type of the service, and generate virtual link forwarding entries of the remote access node and a core aggregation node, where the virtual link forwarding entry includes a virtual link forwarding entry of the core aggregation node and a virtual link forwarding entry of the remote access node, an interface of an attachment circuit (Attachment Circuit) in the virtual link forwarding entry of the core aggregation node is the virtualized remote logical interface, and an interface of an attachment circuit in the virtual link forwarding entry of the remote access node is the external interface.

The data transmitter 73 is configured to send the virtual link forwarding entry that is generated by the data calculator to the remote access node and the core aggregation node, so as to set up a virtual link between the core aggregation node and the remote access node.

According to the control device provided by this embodiment of the application, a virtual link between a core aggregation node and a remote access node is set up, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Further, the data calculator 72 is further configured to generate a service forwarding entry of the core aggregation node by performing centralized calculation according to the service configured on the virtualized remote logical interface and a service protocol of the service to be processed, and send the service forwarding entry to the core aggregation node, where an outbound interface of the service forwarding entry is the virtualized remote logical interface.

Further, the service forwarding entry includes a unicast Internet Protocol IP routing and forwarding entry, a Layer 3 virtual private network L3VPN routing and forwarding entry, or a Layer 2 virtual private network L2VPN forwarding entry.

Figure 8:
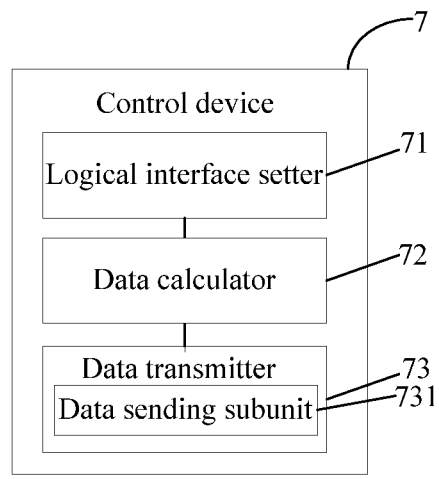
FIG. 8 is a schematic structural diagram of another control device according to an embodiment of the application.

Optionally, as shown in FIG. 8, the data transmitter 73 includes a data sending subunit 731.

The data sending subunit 731 is configured to send the virtual link forwarding entry to the core aggregation node through a control channel between the control device and the core aggregation node, and send, the virtual link forwarding entry to the remote access node through a control channel between the remote access node and the core aggregation node.

Optionally, the core aggregation node includes a core aggregation node as a main frame and a core aggregation node as a backup frame; and the core aggregation node as a main frame and the core aggregation node as a backup frame share the control device.

The data transmitter 73 is specifically further configured to send the virtual link forwarding entry to the remote access node, the core aggregation node as a main frame, and the core aggregation node as a backup frame.

Further, the data transmitter 73 is further configured to set a routing entry in a first service forwarding entry that is generated for the core aggregation node as a main frame as a primary route, and send the first service forwarding entry to the core aggregation node as a main frame.

The data transmitter 73 is further configured to set a routing entry in a second service forwarding entry that is generated for the core aggregation node as a backup frame as a secondary route, and send the second service forwarding entry to the core aggregation node as a backup frame.

According to the control device provided by this embodiment of the application, a virtual link is set up between a core aggregation node and a remote access node, a core aggregation node as a main frame and a core aggregation node as a backup frame are exchanged in terms of function during an actual operation, and a routing and forwarding entry of a corresponding service protocol is forwarded to the core aggregation node through the virtual link that is set up, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Figure 9:
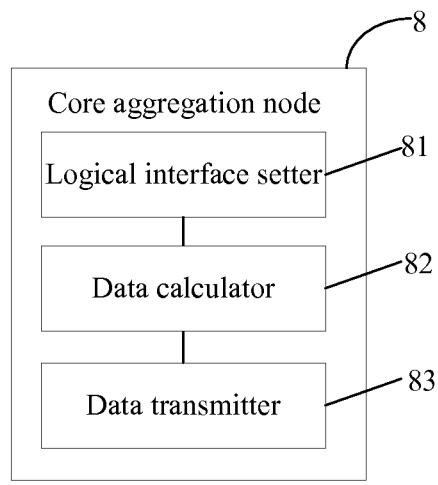
FIG. 9 is a schematic structural diagram of a core aggregation node according to an embodiment of the application.

An embodiment of the application provides a core aggregation node 8. The core aggregation node may be specifically a device that can implement data transmission of network virtualization by using such as a large-capacity and high-performance router or switch in a mobile communications network. A specific form of the core aggregation node is not specifically limited in this embodiment of the application, it is acceptable as long as it can implement any one of the foregoing methods for data transmission of network virtualization provided by the embodiments of the application. As shown in FIG. 9, the core aggregation node includes:

a logical interface setter 81, configured to create, on the core aggregation node, a virtualized remote logical interface for an external interface of a remote access node, where the external interface of the remote access node is an interface that is configured to connect to another network device;

a data calculator 82, configured to identify, according to a service configured on the virtualized remote logical interface that is created by the logical interface setter, a service type of the service, and generate virtual link forwarding entries of the remote access node and the core aggregation node, where the virtual link forwarding entry includes a virtual link forwarding entry of the core aggregation node and a virtual link forwarding entry of the remote access node, and an interface of an attachment circuit (Attachment Circuit) in the virtual link forwarding entry of the core aggregation node is the virtualized remote logical interface; and a data transmitter 83, configured to store the virtual link forwarding entry of the core aggregation node, and send the virtual link forwarding entry that is of the remote access node and generated by the data calculator to the remote access node, so as to set up a virtual link between the core aggregation node and the remote access node.

According to the core aggregation node provided by this embodiment of the application, a virtual link between the core aggregation node and a remote access node is set up, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Further, the data calculator 82 is further configured to generate a service forwarding entry of the core aggregation node by performing centralized calculation according to the service configured on the virtualized remote logical interface and a service protocol of the service to be processed, and store the service forwarding entry, where an outbound interface of the service forwarding entry is the virtualized remote logical interface.

Further, the service forwarding entry includes: a unicast Internet Protocol IP routing and forwarding entry, a Layer 3 virtual private network L3VPN routing and forwarding entry, or a Layer 2 virtual private network L2VPN forwarding entry.

Figure 10:
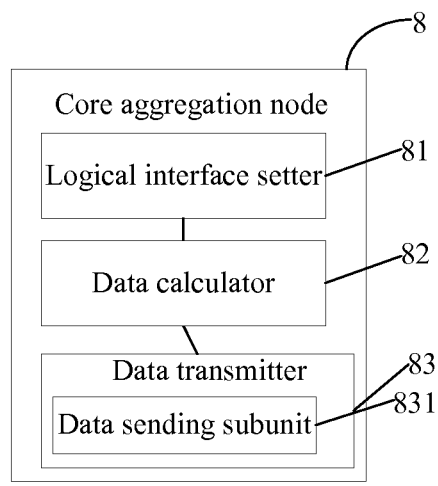
FIG. 10 is a schematic structural diagram of another core aggregation node according to an embodiment of the application.

Optionally, as shown in FIG. 10, the data transmitter 83 includes:

a data sending subunit 831, configured to send the virtual link forwarding entry to the remote access node through a control channel between the remote access node and the core aggregation node.

Optionally, the core aggregation node includes a core aggregation node as a main frame and a core aggregation node as a backup frame.

The data transmitter 83 is specifically further configured to send the virtual link forwarding entry to the remote access node and the core aggregation node as a backup frame.

Further, the data transmitter 83 is further configured to set a routing entry in a first service forwarding entry that is generated for the core aggregation node as a main frame as a primary route, and store the first service forwarding entry; and set, by using the core aggregation node as a main frame, a routing entry in a second service forwarding entry that is generated for the core aggregation node as a backup frame as a secondary route, and send the second service forwarding entry to the core aggregation node as a backup frame.

According to the core aggregation node provided by this embodiment of the application, a virtual link is set up between a core aggregation node and a remote access node, a core aggregation node as a main frame and a core aggregation node as a backup frame are exchanged in terms of function during an actual operation, and a routing and forwarding entry of a corresponding service protocol is forwarded to the core aggregation node through the virtual link that is set up, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Figure 11:
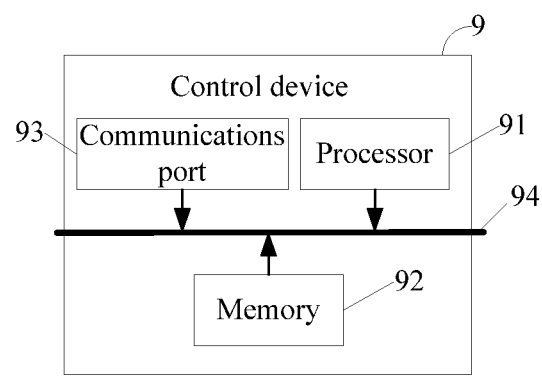
FIG. 11 is a schematic structural diagram of a control device according to another embodiment of the application.

The application provides a control device 9. As shown in FIG. 11, the device may be embedded into a micro-processing computer or be a micro-processing computer itself, for example, a general-purpose computer, a customized computer, or a portable device such as a mobile phone terminal or a tablet computer, and include: at least one processor 91, a memory 92, a communications interface 93, and a bus 94. The processor 91, the memory 92, and the communications interface 93 are connected and communicate with each other by using the bus 94.

The bus 94 may be an industry standard architecture (Industry Standard Architecture, ISA for short) bus, a peripheral component interconnect (Peripheral Component Interconnect, PCI for short) bus, an extended industry standard architecture (Extended Industry Standard Architecture, EISA for short) bus, or the like. The bus may be classified into an address bus, a data bus, a control bus, and the like. For convenience of representation, the bus is represented by using only one thick line in FIG. 11; however, it does not indicate that there is only one bus or only one type of bus.

The memory 92 is configured to store executable program code, where the program code includes computer operation instructions. The memory 92 may include a high-speed RAM memory, and may also further include a non-volatile memory (non-volatile memory), such as at least one disk memory.

The processor 91 may be a central processing unit (Central Processing Unit, CPU for short) or an application-specific integrated circuit (Application-Specific Integrated Circuit, ASIC for short), or be configured as one or more integrated circuits implementing the embodiments the application.

The communications interface 93 is mainly configured to implement communication between apparatuses in this embodiment.

The processor 91 is configured to create, on the control device, a virtualized remote logical interface for an external interface of a remote access node, where the external interface of the remote access node is an interface that is configured to connect to another network device.

The processor 91 is further configured to identify, according to a service configured on the virtualized remote logical interface, a service type of the service, and generate virtual link forwarding entries of the remote access node and a core aggregation node, where the virtual link forwarding entry includes a virtual link forwarding entry of the core aggregation node and a virtual link forwarding entry of the remote access node, an interface of an attachment circuit (Attachment Circuit) in the virtual link forwarding entry of the core aggregation node is the virtualized remote logical interface, and an interface of an attachment circuit in the virtual link forwarding entry of the remote access node is the external interface.

The processor 91 is further configured to send the virtual link forwarding entry to the remote access node and the core aggregation node through at least one communications interface, so as to set up a virtual link between the core aggregation node and the remote access node.

According to the control device provided by this embodiment of the application, a virtual link is set up between a core aggregation node and a remote access node, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Further, the processor 91 is further configured to generate a service forwarding entry of the core aggregation node by performing centralized calculation according to the service configured on the virtualized remote logical interface and a service protocol of the service to be processed, and send the service forwarding entry to the core aggregation node through the at least one communications interface, where an outbound interface of the service forwarding entry is the virtualized remote logical interface.

Further, the service forwarding entry includes a unicast Internet Protocol IP routing and forwarding entry, a Layer 3 virtual private network L3VPN routing and forwarding entry, or a Layer 2 virtual private network L2VPN forwarding entry.

Optionally, the processor 91 is further configured to send the virtual link forwarding entry to the core aggregation node through a control channel between the control device and the core aggregation node and through the at least one communications interface, and send, by using the control device, the virtual link forwarding entry to the remote access node through a control channel between the remote access node and the core aggregation node.

Optionally, the core aggregation node includes a core aggregation node as a main frame and a core aggregation node as a backup frame; and the core aggregation node as a main frame and the core aggregation node as a backup frame share the control device.

The processor 91 is specifically further configured to send the virtual link forwarding entry to the remote access node, the core aggregation node as a main frame, and the core aggregation node as a backup frame through the at least one communications interface.

Further, the processor 91 is further configured to set a routing entry in a first service forwarding entry that is generated for the core aggregation node as a main frame as a primary route, and send the first service forwarding entry to the core aggregation node as a main frame through the at least one communications interface.

The processor 91 is further configured to set a routing entry in a second service forwarding entry that is generated for the core aggregation node as a backup frame as a secondary route, and send the second service forwarding entry to the core aggregation node as a backup frame through the at least one communications interface.

According to the control device provided by this embodiment of the application, a virtual link is set up between a core aggregation node and a remote access node, a core aggregation node as a main frame and a core aggregation node as a backup frame are exchanged in terms of function during an actual operation, and a routing and forwarding entry of a corresponding service protocol is forwarded to the core aggregation node through the virtual link that is set up, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Figure 12:
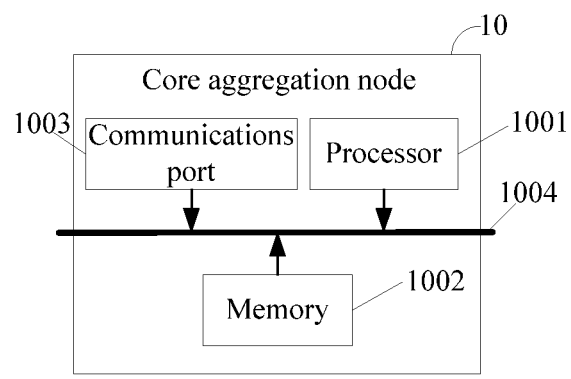
FIG. 12 is a schematic structural diagram of a core aggregation node according to another embodiment of the application.

The application provides a core aggregation node 10. As shown in FIG. 12, the core aggregation node may be embedded into a micro-processing computer or be a micro-processing computer itself, for example, a general-purpose computer, a customized computer, or a portable device such as a mobile phone terminal or a tablet computer, and include: at least one processor 1001, a memory 1002, a communications interface 1003, and a bus 1004. The processor 1001, the memory 1002, and the communications interface 1003 are connected and communicate with each other by using the bus 1004.

The bus 1004 may be an industry standard architecture (Industry Standard Architecture, ISA for short) bus, a peripheral component interconnect (Peripheral Component, PCI for short) bus, an extended industry standard architecture (Extended Industry Standard Architecture, EISA for short) bus, or the like. The bus may be classified into an address bus, a data bus, a control bus, and the like. For convenience of representation, the bus is represented by using only one thick line in FIG. 12; however, it does not indicate that there is only one bus or only one type of bus.

The memory 1002 is configured to store executable program code, where the program code includes computer operation instructions. The memory 1002 may include a high-speed RAM memory, and may also further include a non-volatile memory (non-volatile memory), such as at least one disk memory.

The processor 1001 may be a central processing unit (Central Processing Unit, CPU for short) or an application-specific integrated circuit (Application Specific Integrated Circuit, ASIC for short), or be configured as one or more integrated circuits implementing the embodiments the application.

The communications interface 1003 is mainly configured to implement communication between apparatuses in this embodiment.

The processor 1001 is configured to create, on the core aggregation node, a virtualized remote logical interface for an external interface of a remote access node, where the external interface of the remote access node is an interface that is configured to connect to another network device.

The processor 1001 is further configured to identify, according to a service configured on the virtualized remote logical interface, a service type of the service, and generate virtual link forwarding entries of the remote access node and the core aggregation node, where the virtual link forwarding entry includes a virtual link forwarding entry of the core aggregation node and a virtual link forwarding entry of the remote access node, and an interface of an attachment circuit (Attachment Circuit) in the virtual link forwarding entry of the core aggregation node is the virtualized remote logical interface.

The processor 1001 is further configured to store the virtual link forwarding entry of the core aggregation node, and send the virtual link forwarding entry of the remote access node to the remote access node, so as to set up a virtual link between the core aggregation node and the remote access node.

According to the core aggregation node provided by this embodiment of the application, a virtual link between the core aggregation node and a remote access node is set up, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Further, the processor 1001 is further configured to generate a service forwarding entry of the core aggregation node by performing centralized calculation according to the service configured on the virtualized remote logical interface and a service protocol of the service to be processed, and store the service forwarding entry, where an outbound interface of the service forwarding entry is the virtualized remote logical interface.

Further, the service forwarding entry includes a unicast Internet Protocol IP routing and forwarding entry, a Layer 3 virtual private network L3VPN routing and forwarding entry, or a Layer 2 virtual private network L2VPN forwarding entry.

Optionally, the processor 1001 is further configured to send the virtual link forwarding entry to the remote access node through a control channel between the remote access node and the core aggregation node and through at least one communications interface.

Optionally, the core aggregation node includes a core aggregation node as a main frame and a core aggregation node as a backup frame.

The processor 1001 is specifically further configured to send the virtual link forwarding entry to the remote access node and the core aggregation node as a backup frame through the at least one communications interface.

Further, the processor 1001 is further configured to set a routing entry in a first service forwarding entry that is generated for the core aggregation node as a main frame as a primary route, and store the first service forwarding entry; and set, by using the core aggregation node as a main frame, a routing entry in a second service forwarding entry that is generated for the core aggregation node as a backup frame as a secondary route, and send the second service forwarding entry to the core aggregation node as a backup frame.

According to the core aggregation node provided by this embodiment of the application, a virtual link is set up between a core aggregation node and a remote access node, a core aggregation node as a main frame and a core aggregation node as a backup frame are exchanged in terms of function during an actual operation, and a routing and forwarding entry of a corresponding service protocol is forwarded to the core aggregation node through the virtual link that is set up, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Figure 13:
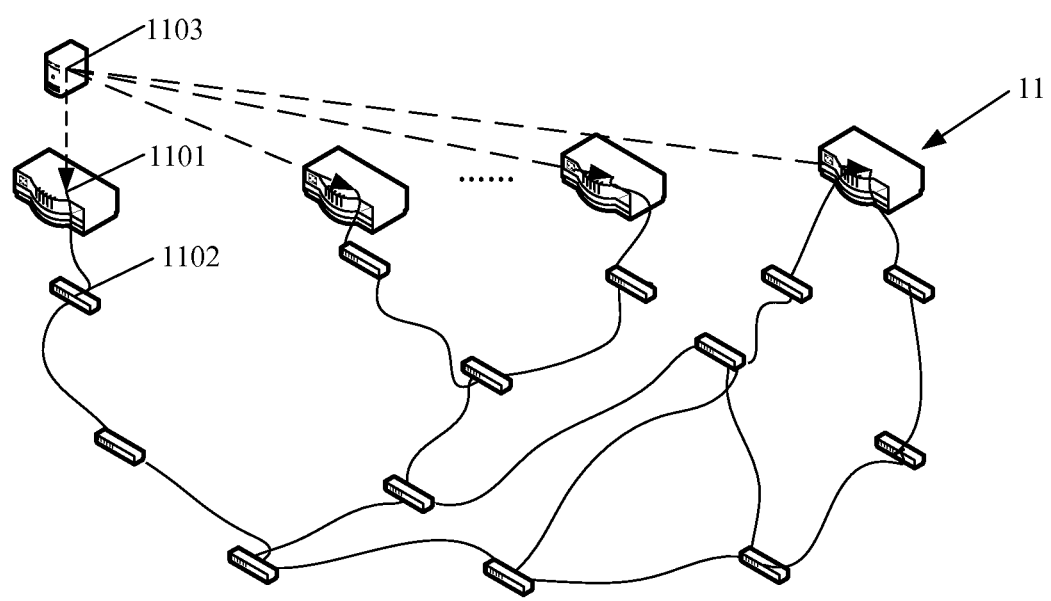
FIG. 13 is a schematic structural diagram of a routing system according to an embodiment of the application.
Figure 14:
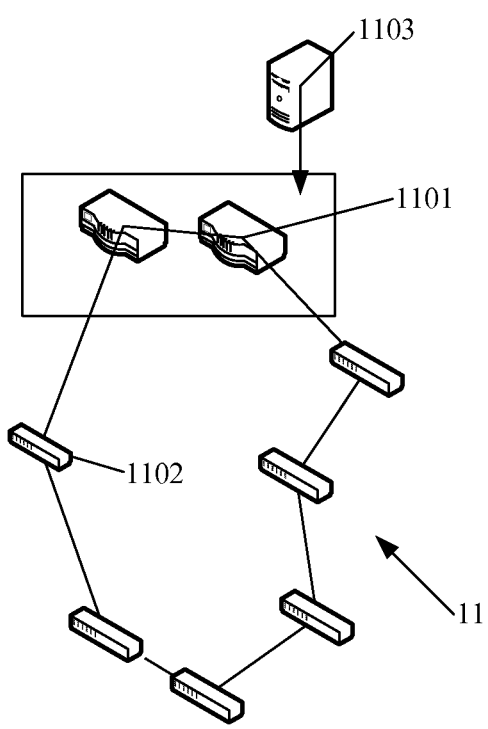
FIG. 14 is a schematic structural diagram of another routing system according to an embodiment of the application.

The application provides a routing system 11. As shown in FIG. 13 and FIG. 14, the routing system 11 includes at least two core aggregation nodes 1101, a plurality of remote access nodes 1102 separately connected to the core aggregation nodes, and at least one control device 1103 connected to any one of the core aggregation nodes, where the control device 1103 is any control device shown in FIG. 7 or FIG. 8, or the control device 1103 is the control device shown in FIG. 11.

A scenario of two Masters is used as an example, as shown in FIG. 13.

Because at least two Masters are included, one Master is a main Master and the other is a backup Master; two core aggregation nodes are the same in terms of functions during running. Therefore, only one of the foregoing core aggregation nodes is described as an example.

In a scenario of a single Master, as shown in FIG. 14, the routing system 11 includes one control device 1103, and the control device is connected to any one core aggregation node 1101.

In the scenario of a single Master herein, the core aggregation node 1101 is classified into a main frame and a backup frame, where the main frame may be a first core aggregation node, and the backup frame may be a second core aggregation node. Certainly, the first core aggregation node may also be used as the backup frame and the second core aggregation node may be used as the main frame, where the main frame and the backup frame are in communication with each other, and the main frame and the backup frame are virtualized into one core aggregation node on a control plane and share one control device.

In the scenario of a single Master, when the control device 1103 is on any core aggregation node of the first core aggregation node and the second core aggregation node, the core aggregation node is set as the main frame, and the other core aggregation node is set as the backup frame, where the main frame is mainly responsible for a function of processing a service packet, and the backup frame forwards a service data packet in replace of the main frame when the main frame cannot run normally.

In this embodiment of the application, there is a function that the first core aggregation node and the second core aggregation node may be exchanged under a special situation, and the function helps improve efficiency of processing various services.

Optionally, the core aggregation node 1101 is further configured to: if an outbound interface that is of the routing system and corresponding to a routing and forwarding entry of the core aggregation node is on the core aggregation node, directly encapsulate, by using the core aggregation node, a service data packet on the outbound interface, and forward the packet to a device connected to the outside of the routing system, wherein, the service data packet of a service protocol corresponding to the core aggregation node refers to a service data packet that is generated after service data in case of protocols, such as a unicast IP service protocol, an L2VPN service protocol, or an L3VPN service protocol, is processed on a virtualized remote logical interface of the core aggregation node; and if the outbound interface that is of the routing system and corresponding to the routing and forwarding entry of the core aggregation node is on a remote access node, send the service data packet out through an outbound interface connected to a tunnel corresponding to a TE tunnel label after an inner layer virtual link label and an outer layer traffic engineering TE tunnel label are encapsulated, where the TE tunnel is an external channel that is set up between the remote access node and the core aggregation node and responsible for bearing a virtual link.

Herein, an internal outbound interface of the core aggregation node 1101 refers to a port that connects the core aggregation node and an external network environment and that is configured to forward a data packet.

Optionally, the remote access node 1102 is further configured to: if an outbound interface that is of the routing system and in a service forwarding entry of the remote access node is on the remote access node:

if the outbound interface is connected to a TE tunnel, send a service data packet through the outbound interface connected to a tunnel corresponding to a TE tunnel label after an inner layer virtual label and an outer layer traffic engineering TE tunnel label are encapsulated, where the TE tunnel is an external channel that is set up between the remote access node and the core aggregation node and responsible for bearing a virtual link; or, if the outbound interface is a local outbound interface of the remote access node, send a service data packet to a device externally connected to the routing system after removing an inner layer virtual link label and an outer layer TE tunnel label.

According to the routing system provided by this embodiment of the application, a virtual link is set up between a core aggregation node and a remote access node, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

Figure 15:
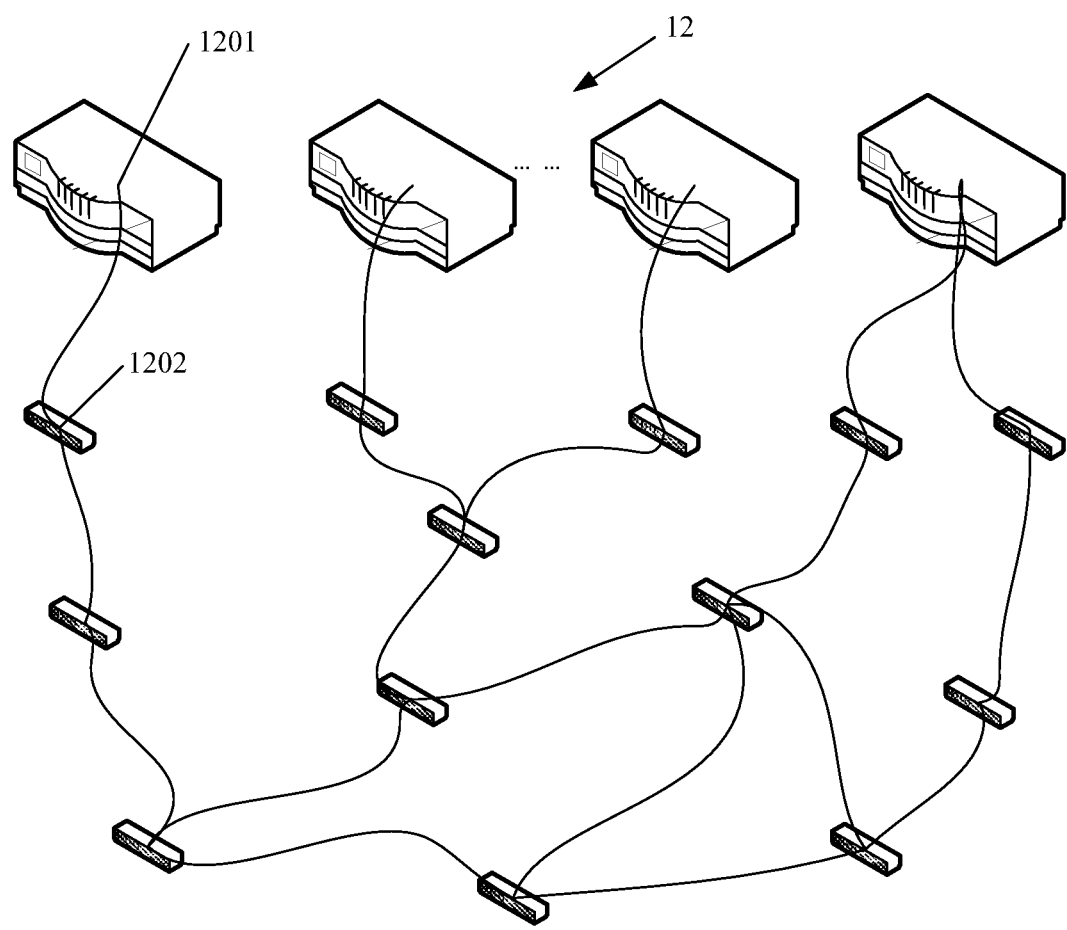
FIG. 15 is a schematic structural diagram of a routing system according to another embodiment of the application.
Figure 16:
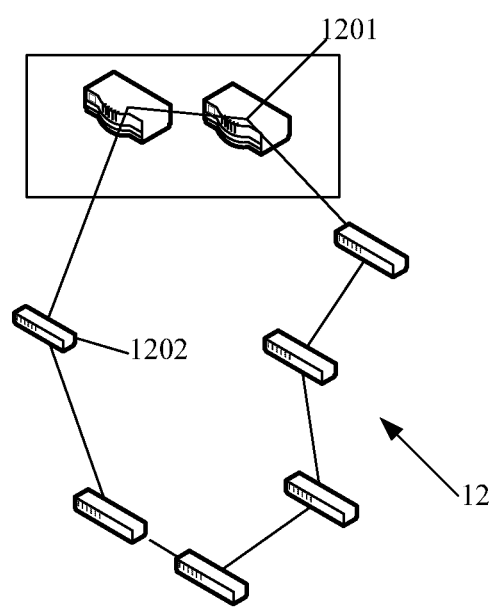
FIG. 16 is a schematic structural diagram of another routing system according to another embodiment of the application.

The application provides a routing system 12. As shown in FIG. 15 and FIG. 16, the routing system 12 includes at least one core aggregation node 1201 and a remote access node 1202 connected to the at least one core aggregation node, where the core aggregation node 1201 is any core aggregation node shown in FIG. 9 or FIG. 10, or the core aggregation node 1201 is any core aggregation node shown in FIG. 12.

A scenario of two Masters is used as an example, as shown in FIG. 15.

Because at least two Masters are included, one Master is a main Master and the other is a backup Master; two core aggregation nodes are the same in terms of function during running. Therefore, only one of the foregoing core aggregation nodes is described as an example.

In a scenario of a single Master, as shown in FIG. 16, in the scenario of a single Master herein, the core aggregation node 1201 is classified into a main frame and a backup frame, where the main frame may be a first core aggregation node and the backup frame may be a second core aggregation node; certainly, the first core aggregation node may also be used as the backup frame and the second core aggregation node may be used as the main frame, and the main frame and the backup frame are in communication with each other.

In the scenario of a single Master, when the control device 1103 is on any core aggregation node of the first core aggregation node and the second core aggregation node, the core aggregation node is set as the main frame, and the other core aggregation node is set as the backup frame, where the main frame is mainly responsible for a function of processing a service packet, and the backup frame forwards a service data packet in replace of the main frame when the main frame cannot run normally.

In this embodiment of the application, there is a function that the first core aggregation node and the second core aggregation node may be exchanged under a special situation, and the function helps improve efficiency of processing various services.

Refer to the embodiment corresponding to FIG. 9 or FIG. 10 for specific steps used by the core aggregation node 1201 to forward service data, which are not described herein again.

In this embodiment of the application, the core aggregation node can create a service configured on a virtualized remote logical interface, identify a service type of the service, and generate virtual link forwarding entries of the remote access node and the core aggregation node, which is equivalent to that a control device is placed in the core aggregation node, so that the core aggregation node can generate a virtual link forwarding entry through calculation according to service types of different services.

According to the routing system provided by this embodiment of the application, a virtual link is set up between a core aggregation node and a remote access node, resolving a problem that complementary adaption inside a network virtualization routing system is required for each type of service when the network virtualization routing system processes unicast IP, L2VPN, and L3VPN services, which is complex to process and has poor connectivity, so that the network virtualization routing system that is based on separation of control and forwarding can support various types of services efficiently and with high quality.

The foregoing descriptions are merely specific implementation manners of the application, but are not intended to limit the protection scope of the application. Any variation or replacement readily figured out by a person skilled in the art within the technical scope disclosed in the application shall fall within the protection scope of the application. Therefore, the protection scope of the application shall be subject to the protection scope of the claims.

What is claimed is:

1. A method for data transmission of network virtualization, comprising:
    creating, on a core aggregation node, a virtualized remote logical interface for an external interface of a remote access node, wherein the external interface of the remote access node is an interface that is configured to connect to another network device;
    identifying, by the core aggregation node according to a service configured on the virtualized remote logical interface, a service type of the service, and generating virtual link forwarding entries of the remote access node and the core aggregation node, wherein the virtual link forwarding entry comprises a virtual link forwarding entry of the core aggregation node and a virtual link forwarding entry of the remote access node, and wherein an interface of an attachment circuit in the virtual link forwarding entry of the core aggregation node is the virtualized remote logical interface;
    storing, by the core aggregation node, the virtual link forwarding entry of the core aggregation node; and
    sending, by the core aggregation node, the virtual link forwarding entry of the remote access node to the remote access node, so as to set up a virtual link between the core aggregation node and the remote access node.

2. The method according to claim 1, further comprising:
generating, by the core aggregation node, a service forwarding entry of the core aggregation node, by performing centralized calculation according to the service configured on the virtualized remote logical interface and a service protocol of the service to be processed; and
storing the service forwarding entry, wherein an outbound interface of the service forwarding entry is the virtualized remote logical interface.

3. The method according to claim 2, wherein the service forwarding entry comprises at least one of a unicast Internet Protocol (IP) routing and forwarding entry, a Layer 3 virtual private network (L3VPN) routing and forwarding entry, or a Layer 2 virtual private network (L2VPN) forwarding entry.

4. The method according to claim 1, wherein the sending, by the core aggregation node, the virtual link forwarding entry to the remote access node comprises:
sending, by the core aggregation node, the virtual link forwarding entry to the remote access node through a control channel between the remote access node and the core aggregation node.

5. The method according to claim 1, wherein the core aggregation node comprises a core aggregation node as a main frame and a core aggregation node as a backup frame; and
wherein the sending, by the core aggregation node, the virtual link forwarding entry to the remote access node comprises sending, by the core aggregation node as the main frame, the virtual link forwarding entry to the remote access node and to the core aggregation node as the backup frame.

6. The method according to claim 5, further comprising:
setting, by the core aggregation node as the main frame, a first routing entry in a first service forwarding entry that is generated for the core aggregation node as the main frame as a primary route;
storing the first service forwarding entry;
setting, by the core aggregation node as the main frame, a second routing entry in a second service forwarding entry that is generated for the core aggregation node as the backup frame as a secondary route; and
sending the second service forwarding entry to the core aggregation node as the backup frame.

7. A control device, comprising:
at least one communications interface;
a processor connected to the at least one communications interface;
a non-transitory computer readable medium connected to the processor by a data bus, the non-transitory computer readable medium having instructions stored thereon that, when executed by the processor, cause the processor to:
create, on the control device, a virtualized remote logical interface for an external interface of a remote access node, wherein the external interface of the remote access node is an interface that is configured to connect to another network device;
identify, according to a service configured on the virtualized remote logical interface, a service type of the service, and generate virtual link forwarding entries of the remote access node and a core aggregation node, wherein the virtual link forwarding entry comprises a virtual link forwarding entry of the core aggregation node and a virtual link forwarding entry of the remote access node, wherein an interface of an attachment circuit in the virtual link forwarding entry of the core aggregation node is the virtualized remote logical interface, and wherein an interface of an attachment circuit in the virtual link forwarding entry of the remote access node is the external interface; and
send the virtual link forwarding entry to the remote access node and to the core aggregation node through the at least one communications interface, so as to set up a virtual link between the core aggregation node and the remote access node.

8. The control device according to claim 7, wherein the non-transitory computer readable medium further has instructions stored thereon that, when executed by the processor, cause the processor to:
generate a service forwarding entry of the core aggregation node by performing centralized calculation according to the service configured on the virtualized remote logical interface and a service protocol of the service to be processed; and
send the service forwarding entry to the core aggregation node through the at least one communications interface, wherein an outbound interface of the service forwarding entry is the virtualized remote logical interface.

9. The control device according to claim 8, wherein the service forwarding entry comprises at least one of a unicast Internet Protocol (IP) routing and forwarding entry, a Layer 3 virtual private network (L3VPN) routing and forwarding entry, or a Layer 2 virtual private network (L2VPN) forwarding entry.

10. The control device according to claim 7, wherein the non-transitory computer readable medium further has instructions stored thereon that, when executed by the processor, cause the processor to:
send the virtual link forwarding entry to the core aggregation node through a control channel between the control device and the core aggregation node and through the at least one communications interface; and
send, by using the control device, the virtual link forwarding entry to the remote access node through a control channel between the remote access node and the core aggregation node.

11. The control device according to claim 7, wherein the core aggregation node comprises a core aggregation node as a main frame and a core aggregation node as a backup frame;
wherein the core aggregation node as a main frame and the core aggregation node as a backup frame share the control device; and
wherein the non-transitory computer readable medium further has instructions stored thereon that, when executed by the processor, cause the processor to send the virtual link forwarding entry to the remote access node, to the core aggregation node as the main frame, and to the core aggregation node as the backup frame through the at least one communications interface.

12. The control device according to claim 11, wherein the non-transitory computer readable medium further has instructions stored thereon that, when executed by the processor, cause the processor to:
set a first routing entry in a first service forwarding entry that is generated for the core aggregation node as the main frame as a primary route;
send the first service forwarding entry to the core aggregation node as the main frame through the at least one communications interface;

set a second routing entry in a second service forwarding entry that is generated for the core aggregation node as the backup frame as a secondary route; and send the second service forwarding entry to the core aggregation node as the backup frame through the at least one communications interface.

13. A core aggregation node, comprising:

at least one communications interface;

a processor connected to the at least one communications interface;

a non-transitory computer readable medium connected to the processor by a data bus, the non-transitory computer readable medium having instructions stored thereon that, when executed by the processor, cause the processor to:

create, on the core aggregation node, a virtualized remote logical interface for an external interface of a remote access node, wherein the external interface of the remote access node is an interface that is configured to connect to another network device;

identify, according to a service configured on the virtualized remote logical interface, a service type of the service, and generate virtual link forwarding entries of the remote access node and the core aggregation node, wherein the virtual link forwarding entry comprises a virtual link forwarding entry of the core aggregation node and a virtual link forwarding entry of the remote access node, and an interface of an attachment circuit in the virtual link forwarding entry of the core aggregation node is the virtualized remote logical interface; and store the virtual link forwarding entry of the core aggregation node, and send the virtual link forwarding entry of the remote access node to the remote access node, so as to set up a virtual link between the core aggregation node and the remote access node.

14. The core aggregation node according to claim 13, wherein the non-transitory computer readable medium further has instructions stored thereon that, when executed by the processor, cause the processor to:

generate a service forwarding entry of the core aggregation node by performing centralized calculation according to the service configured on the virtualized remote logical interface and a service protocol of the service to be processed; and store the service forwarding entry, wherein an outbound interface of the service forwarding entry is the virtualized remote logical interface.

15. The core aggregation node according to claim 14, wherein the service forwarding entry comprises at least one of a unicast Internet Protocol (IP) routing and forwarding entry, a Layer 3 virtual private network (L3VPN) routing and forwarding entry, or a Layer 2 virtual private network (L2VPN) forwarding entry.

16. The core aggregation node according to claim 13, wherein the non-transitory computer readable medium further has instructions stored thereon that, when executed by the processor, cause the processor to:

send the virtual link forwarding entry to the remote access node through a control channel between the remote access node and the core aggregation node and through the at least one communications interface.

17. The core aggregation node according to claim 13, wherein the core aggregation node comprises a core aggregation node as a main frame and a core aggregation node as a backup frame; and wherein the non-transitory computer readable medium further has instructions stored thereon that, when executed by the processor, cause the processor to send the virtual link forwarding entry to the remote access node and to the core aggregation node as the backup frame through the at least one communications interface.

18. The core aggregation node according to claim 17, wherein the non-transitory computer readable medium further has instructions stored thereon that, when executed by the processor, cause the processor to:

set a first routing entry in a first service forwarding entry that is generated for the core aggregation node as the main frame as a primary route;

store the first service forwarding entry;

set, by using the core aggregation node as a main frame, a second routing entry in a second service forwarding entry that is generated for the core aggregation node as the backup frame as a secondary route; and send the second service forwarding entry to the core aggregation node as a backup frame.

19. A routing system, comprising:

at least one core aggregation node according to claim 13; and a remote access node connected to the at least one core aggregation node.

* * * * *